(12) United States Patent
Isoda

(10) Patent No.: US 7,715,048 B2
(45) Date of Patent: May 11, 2010

(54) PRINT CONTROLLING APPARATUS PERFORMING VARIABLE PRINTING INCLUDING WATERMARK IMAGE, AND METHOD THEREFOR

(75) Inventor: Takashi Isoda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 461 days.

(21) Appl. No.: 11/828,471

(22) Filed: Jul. 26, 2007

(65) Prior Publication Data

US 2008/0024828 A1 Jan. 31, 2008

(30) Foreign Application Priority Data

Jul. 31, 2006 (JP) .............................. 2006-208263

(51) Int. Cl.
*H04N 1/387* (2006.01)
*G06K 15/02* (2006.01)
*B41M 3/10* (2006.01)

(52) U.S. Cl. ...................... 358/1.9; 358/3.28; 358/1.13; 358/1.18

(58) Field of Classification Search ................ 358/3.28, 358/1.14, 1.9, 1.18, 1.13, 440, 450; 382/100, 382/115; 283/113, 902; 340/5.8, 5.86; 715/221, 715/224, 243
See application file for complete search history.

(56) References Cited

U.S. PATENT DOCUMENTS

| | | | | |
|---|---|---|---|---|
| 7,280,255 | B1 * | 10/2007 | Fuse | .......................... 358/3.28 |
| 7,509,060 | B2 * | 3/2009 | Yaguchi et al. | ............... 399/15 |
| 2004/0012812 | A1 * | 1/2004 | Shimizu | ..................... 358/1.14 |
| 2006/0274939 | A1 * | 12/2006 | Yamada | ...................... 382/173 |
| 2007/0133038 | A1 * | 6/2007 | Otake et al. | ................ 358/1.14 |

FOREIGN PATENT DOCUMENTS

| JP | 07-064481 A | 3/1995 |
|---|---|---|
| JP | 2001-030587 A | 2/2001 |

* cited by examiner

*Primary Examiner*—Scott A Rogers
(74) *Attorney, Agent, or Firm*—Canon U.S.A., Inc., IP Division

(57) ABSTRACT

A print-data generating apparatus utilizes advantages of both a printed matter and electronic data. Information to be contained on a sheet of paper is separated into secret information and public information. The public information is presented such that the content thereof can be made public on a sheet. The secret information is embedded in the sheet as watermark image data, which is reversibly convertible electronic data. Print data based on a portion including the public information and a portion including the secret information is generated on the same sheet and a printed matter is printed. Accordingly, information contained on paper is prevented from leaking, and the convenience of paper is ensured.

11 Claims, 20 Drawing Sheets

FIG. 2

| NO. | NAME | AGE | ADDRESS | PHONE NO. | E-MAIL ADDRESS |
|---|---|---|---|---|---|
| 1 | TARO TOKYO | 30 | 1-1-1 CHUO-KU, TOKYO | 03-1234-5678 | tokyo@tokkyo.ne.jp |
| 2 | JIRO OSAKA | 31 | 2-2-2 MINAMI-KU, OSAKA-SI | 03-9876-4321 | osaka@tokkyo.ne.jp |
| 3 | SABURO NAGOYA | 29 | 3-3-3 SAKAE-KU, NAGOYA-SI | 098-789-3210 | nagoya@tokkyo.ne.jp |
| 4 | SHIRO SAPPORO | 24 | 4-4-4 KITA-KU, SAPPORO-SI | 011-456-7890 | sapporo@tokkyo.ne.jp |
| | | | | | |
| 98 | KUJUHACHI KAGOSHIMA | 41 | 98-98 NAKAMACHI, KAGOSIMA-SI | 098-765-3212 | kagosima@tokkyo.ne.jp |
| 99 | KUJUKURO NAHA | 39 | 99-99 KAIGANDORI, NAHA-SI | 099-456-1234 | naha@tokkyo.ne.jp |

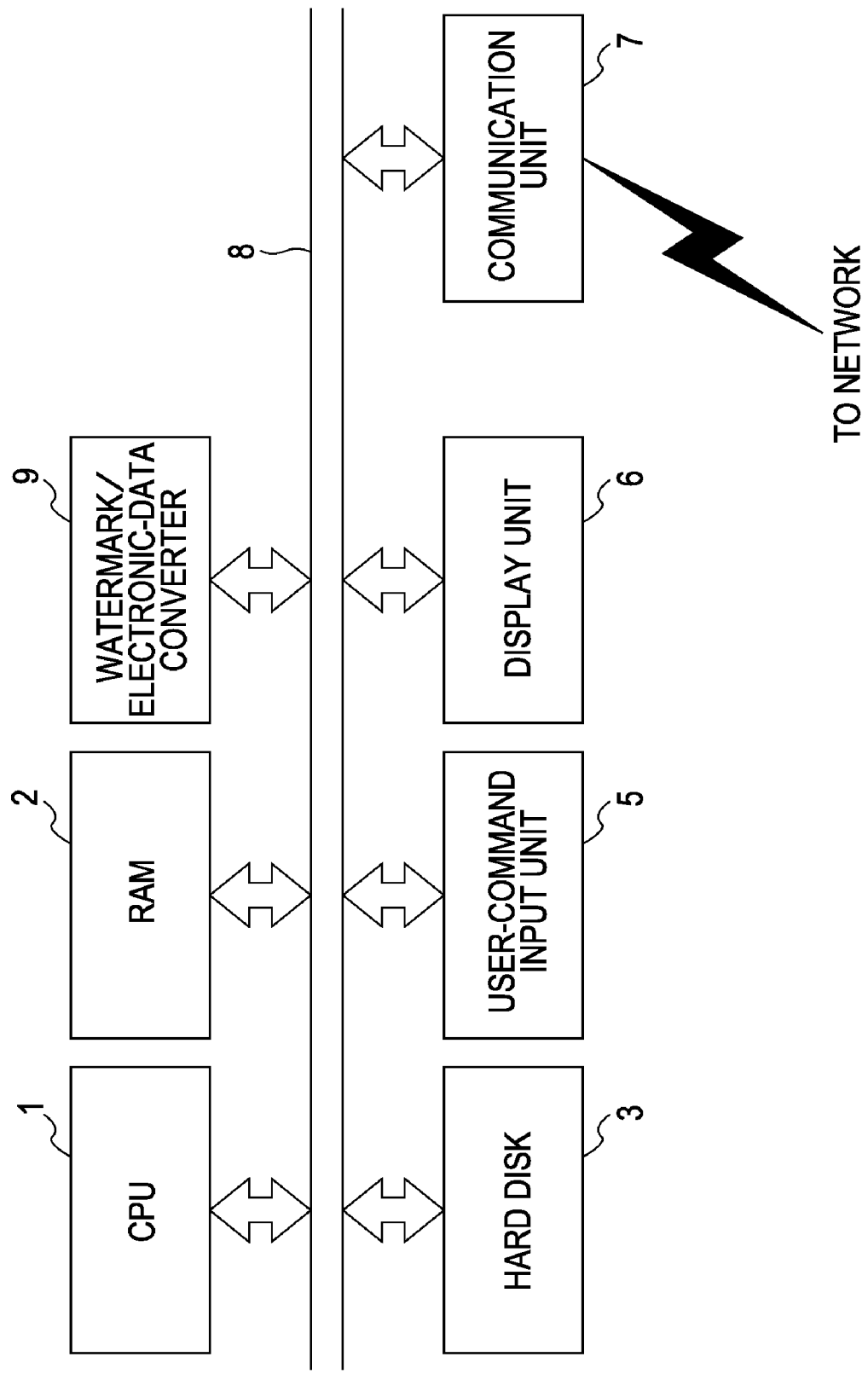

WATERMARK PRINTING SETTING

● PERFORM WATERMARK PRINTING

SPECIFY PORTION(S) TO BE WATERMARK-PRINTED
        ☑ PROTECTED INFORMATION PORTION
        ☐ TEMPLATE

EMBED WATERMARK PRINTING
    SPECIFY FILE FORMAT

[ XSL FORMAT ▼ ]

EMBED WATERMARK
    ENCRYPT FILE
        ☐ YES     [ DETAILS OF ENCRYPTION METHOD ]

SPECIFY PORTION(S) TO BE PRINTED NORMALLY
        ☐ PROTECTED INFORMATION PORTION
        ☑ TEMPLATE

○ NO WATERMARK PRINTING

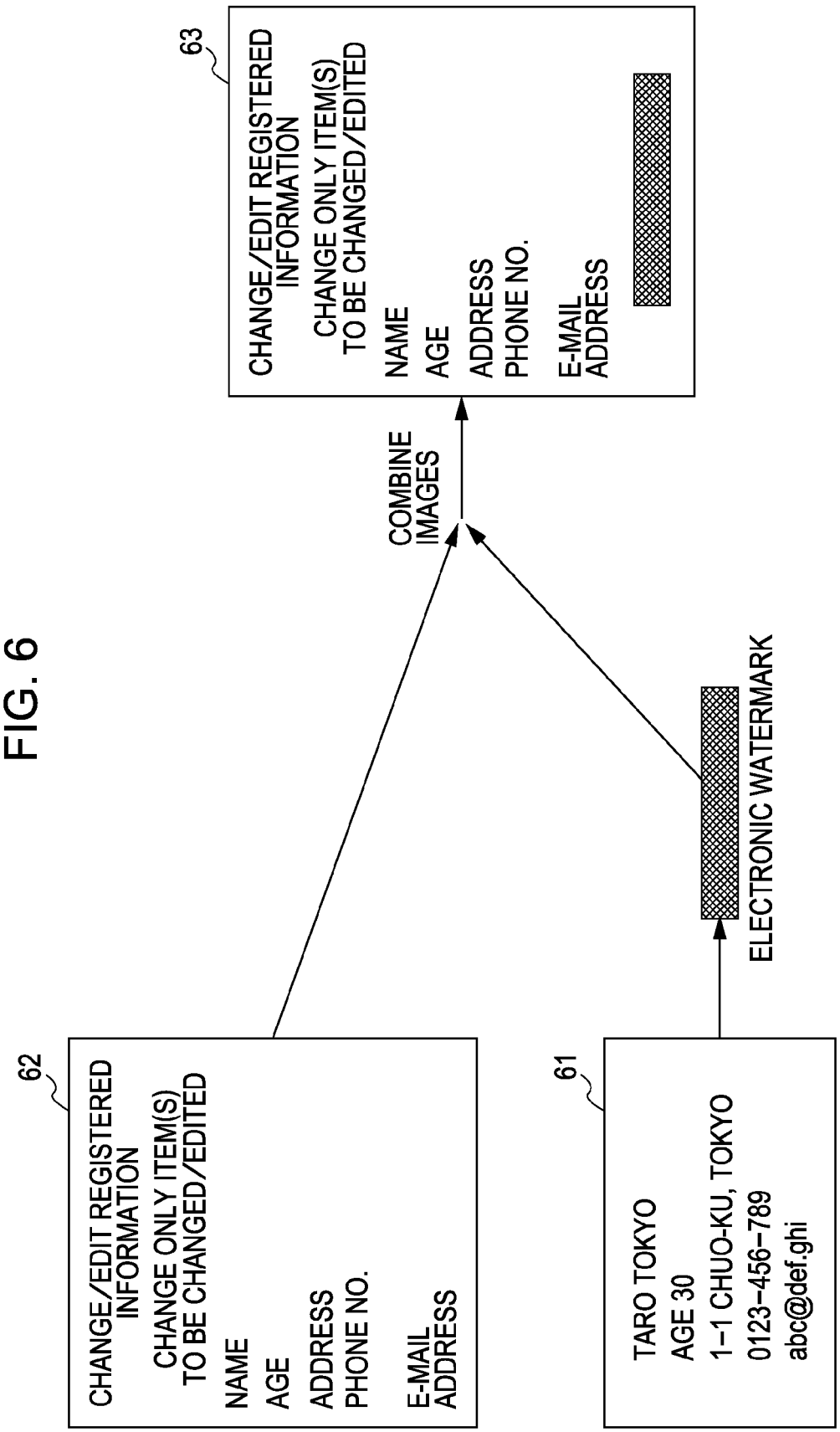

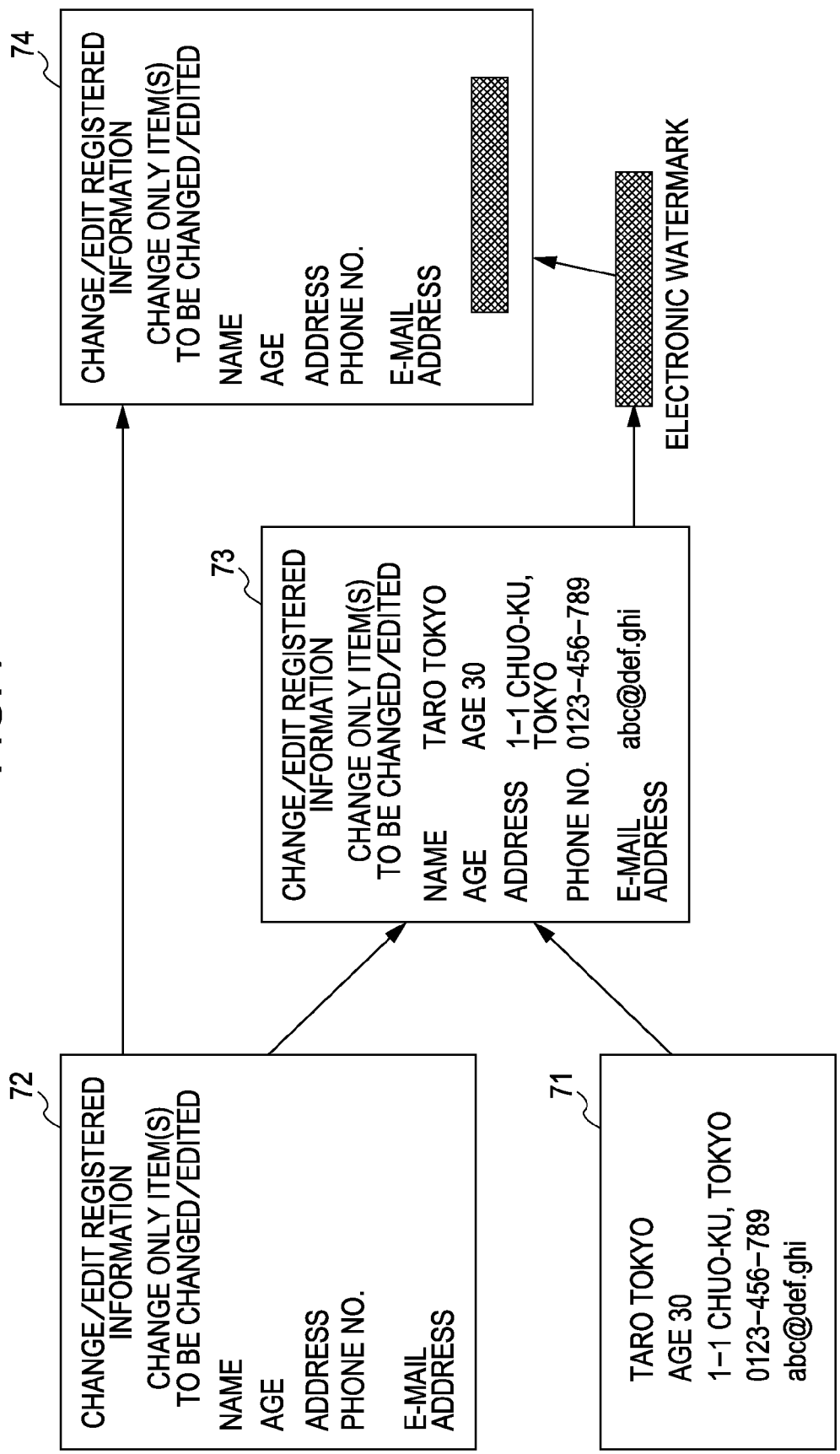

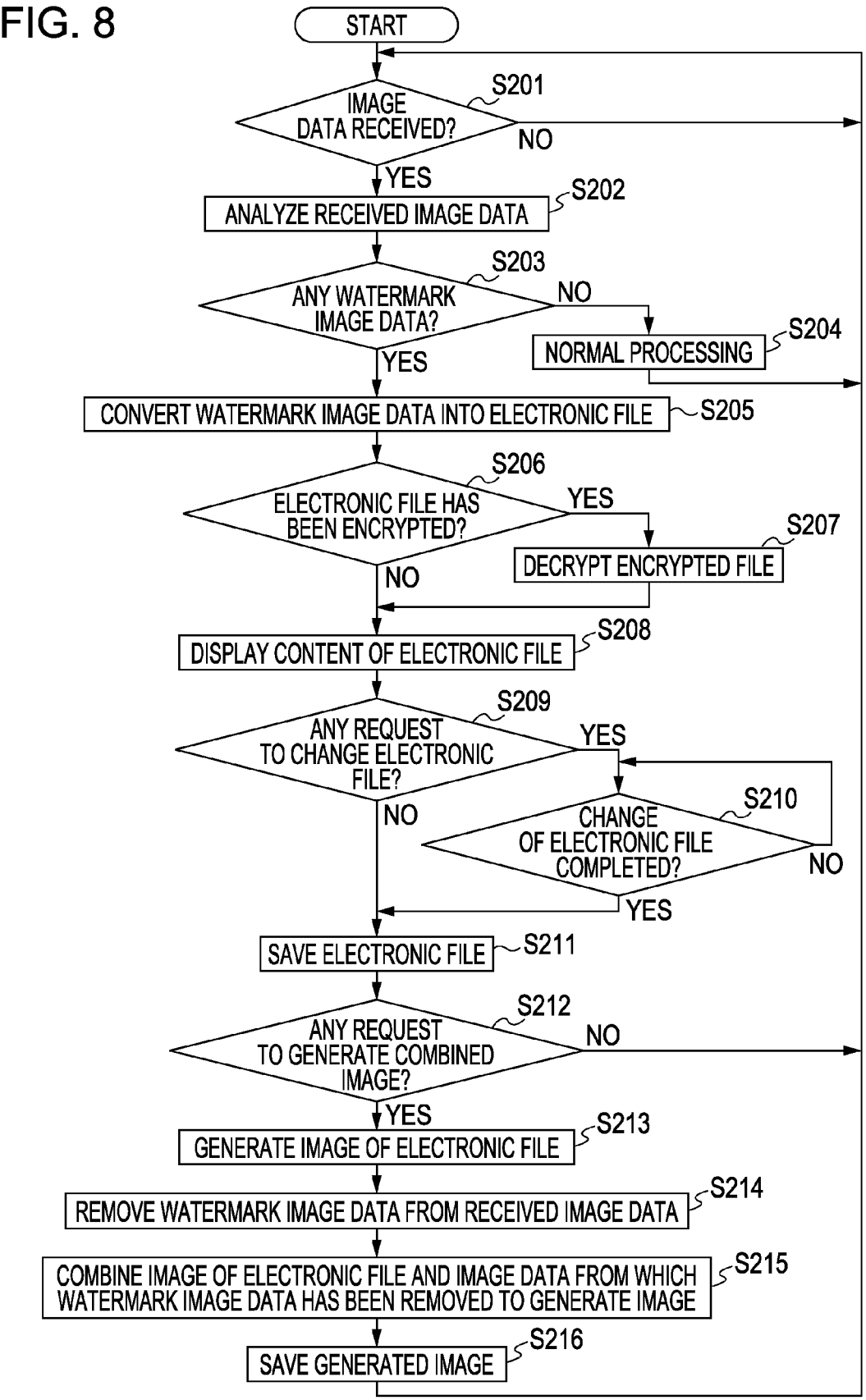

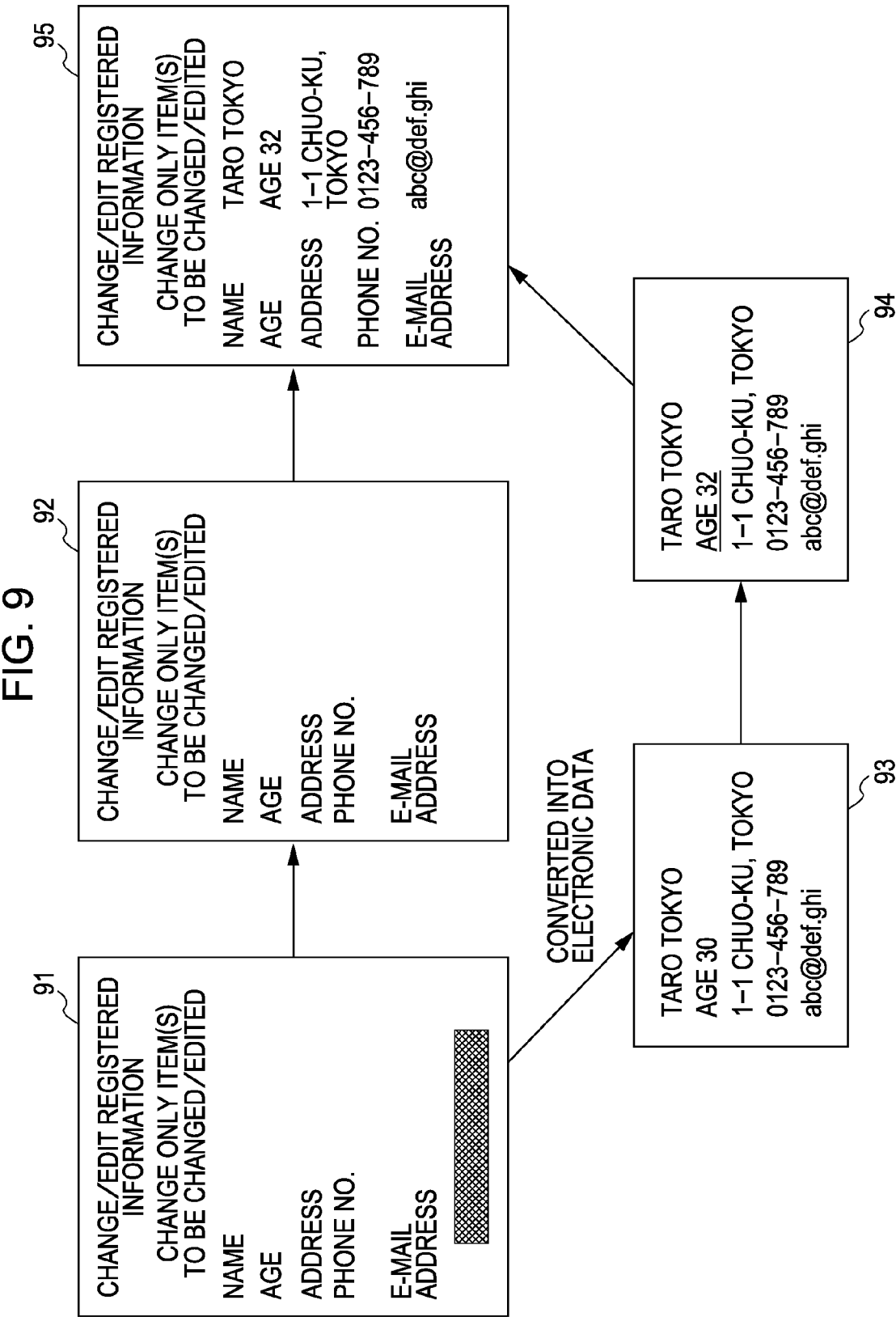

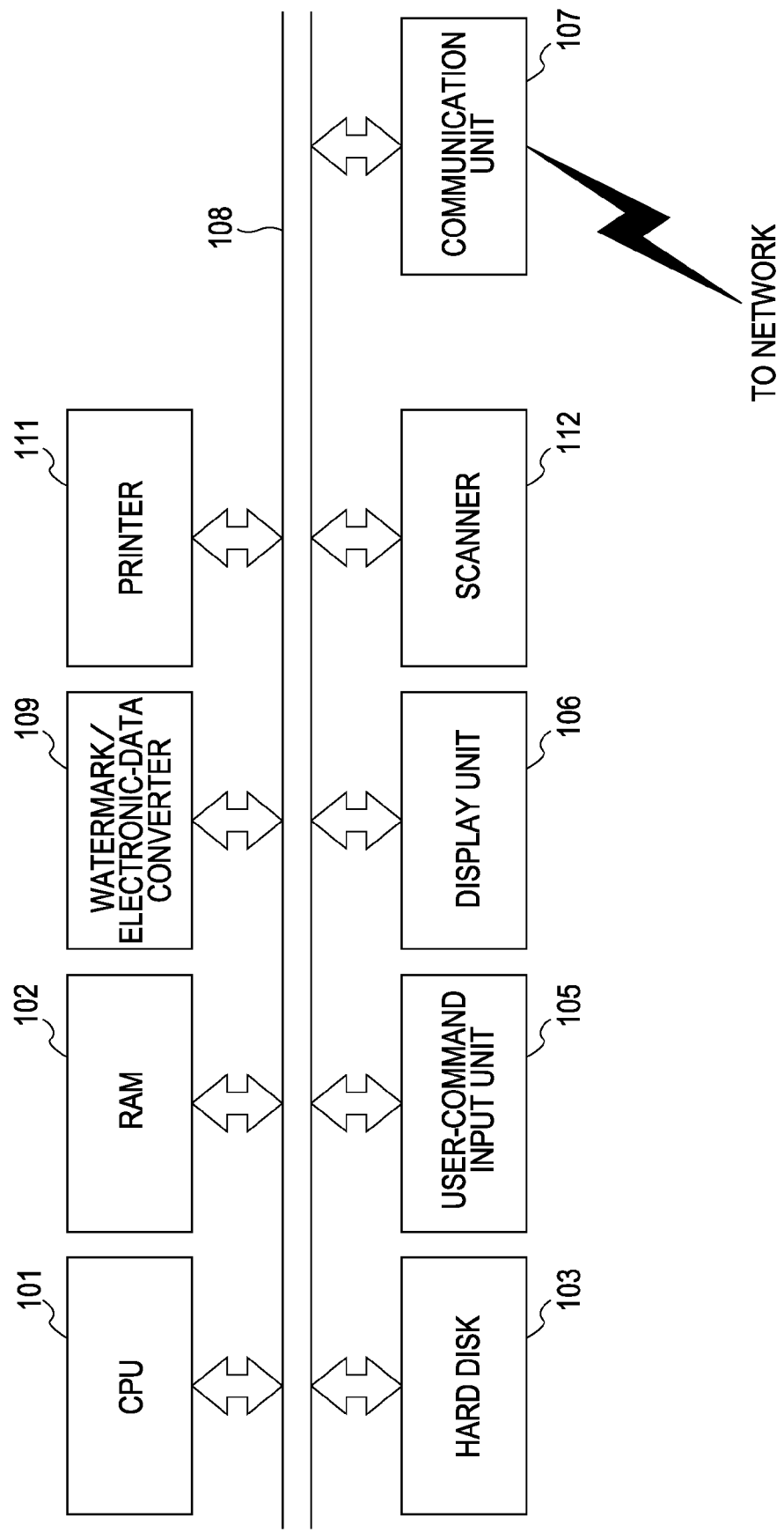

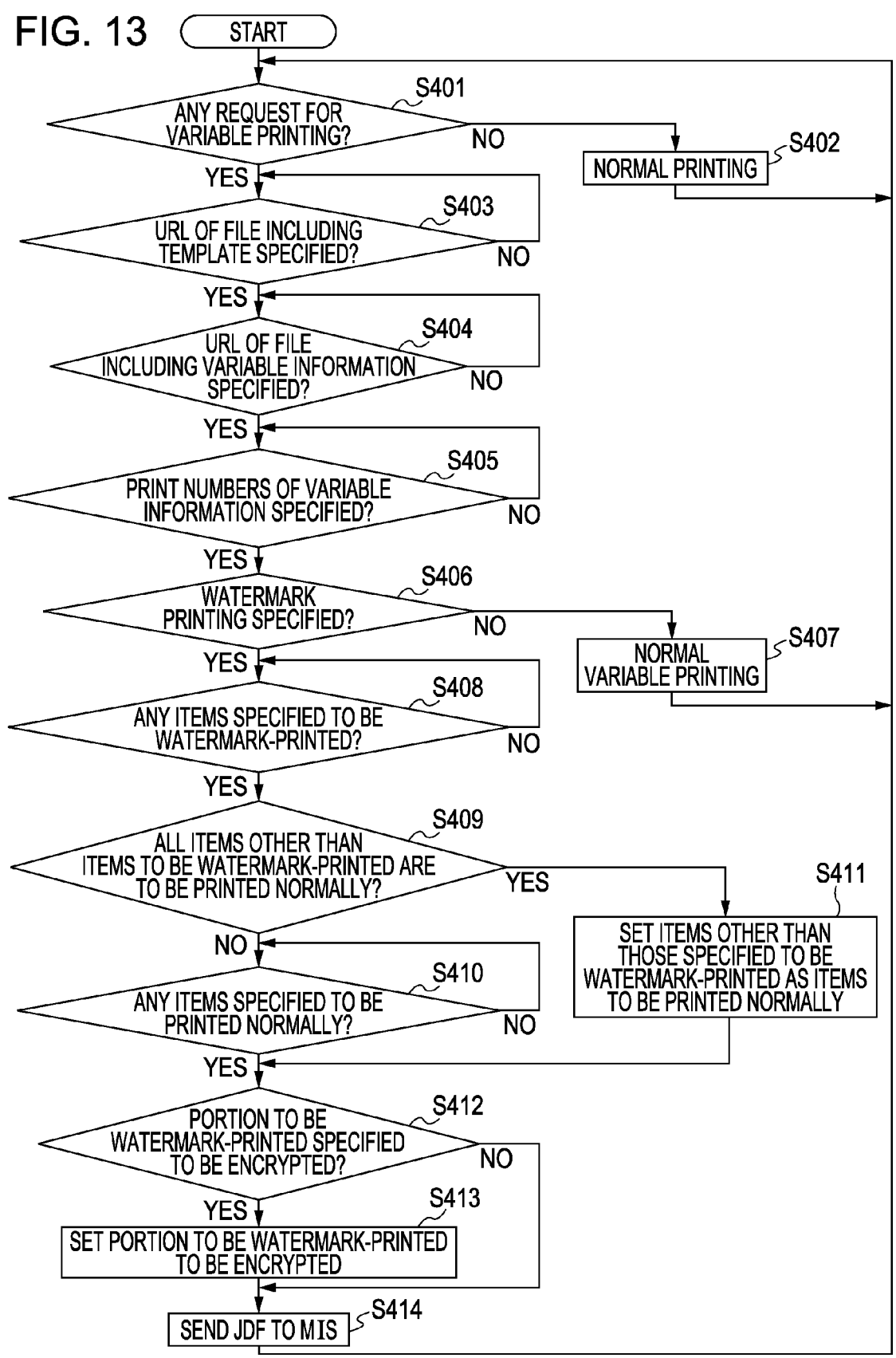

| VARIABLE PRINTING | SPECIFY FILE AND PRINT ITEMS |

- SPECIFY URL OF TEMPLATE FILE
  ENTER URL OF TEMPLATE FILE

FTP://ftp.abcde.co.jp/templete.xls

- SPECIFY URL OF VARIABLE FILE
  ENTER URL OF VARIABLE FILE

FTP://ftp.fgghij.co.jp/variable.xls

- SPECIFY NUMBERS OF VARIABLE PRINTING
  SPECIFY START AND END NUMBERS OF VARIABLE DATA TO BE PRINTED

PRINT START NUMBER  01
  PRINT END NUMBER    99

VARIABLE PRINTING    SPECIFY WATERMARK

● PERFORM WATERMARK PRINTING

SPECIFY PORTION(S) TO BE WATERMARK-PRINTED
☐ ENTIRE VARIABLE PORTION
☐ NAME   ■ AGE   ☐ ADDRESS
■ PHONE NUMBER   ■ E-MAIL ADDRESS
☐ TEMPLATE

EMBED WATERMARK PRINTING
SPECIFY FILE FORMAT    [XSL FORMAT ▼]
EMBED WATERMARK
ENCRYPT FILE    ☐ ENCRYPT    [DETAILS]

SPECIFY PORTION(S) TO BE PRINTED NORMALLY
■ ENTIRE VARIABLE PORTION OTHER
THAN PORTION(S) SPECIFIED TO BE
WATERMARK-PRINTED AND TEMPLATE
☐ NAME   ☐ AGE   ☐ ADDRESS
☐ PHONE NUMBER   ☐ E-MAIL ADDRESS
☐ TEMPLATE

○ NO WATERMARK PRINTING

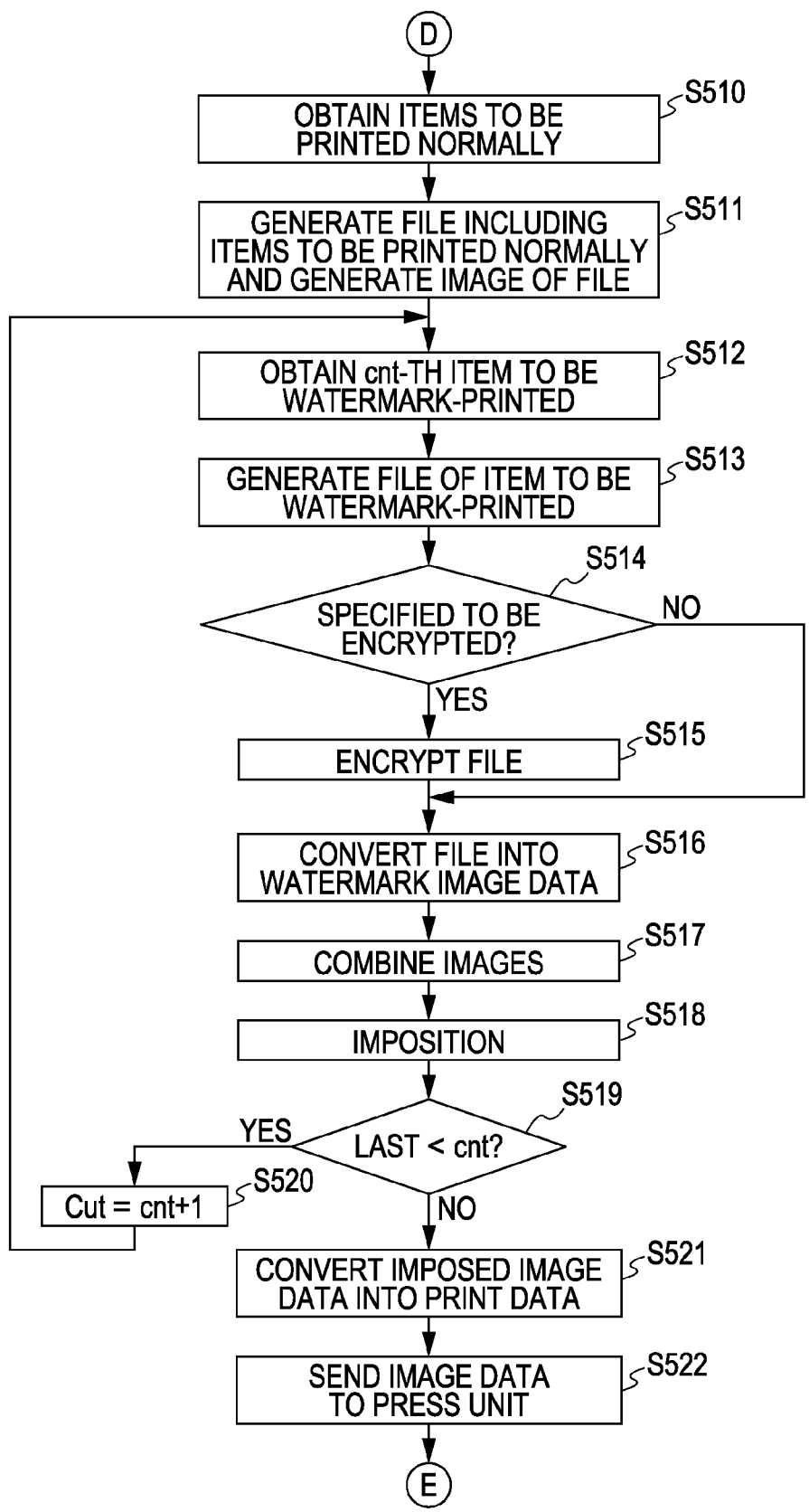

PRINT CONTROLLING APPARATUS PERFORMING VARIABLE PRINTING INCLUDING WATERMARK IMAGE, AND METHOD THEREFOR

BACKGROUND OF THE INVENTION

1. Field of the Invention

The present invention relates to print-data generating apparatuses, print-data processing apparatuses, and print systems, and more particularly, to the technique suitable for use in printing information on a sheet of paper.

2. Description of the Related Art

When printing information on a sheet of paper, the information is generally printed directly on the sheet such that the information can be visually conveyed. To edit or change the information printed on the sheet or to add new information to the sheet, electronic editing may be required.

To satisfy such needs, the technique of embedding a method of accessing electronic data corresponding to information printed on a sheet of paper in the information printed on the sheet in the form of, for example, a uniform resource locator (URL) or a file path has been proposed in, for example, Japanese Patent Laid-Open No 2001-30587. In this method, however, obtaining the electronic data corresponding to the information printed on the sheet requires an environment that permits accessing the electronic data using the accessing method embedded in the information printed on the sheet.

To solve the above-mentioned problem, the technique of embedding electronic data corresponding to information printed on a sheet of paper as a reversibly convertible image (meaning that the original electronic data can be regenerated after a change by the reverse of the change) has been proposed in, for example, Japanese Patent Laid-Open No 7-64481. In the following description, this technique is referred to as a "watermarking scheme" if needed.

In this technique, given a method of extracting the electronic data from such a watermark image, a user can obtain the electronic data corresponding to the information printed on the sheet regardless of the environment. The electronic data can also be carried and distributed easily in the form of paper, which is an inexpensive medium. The technique of embedding the method of accessing the electronic data in the information printed on the sheet requires a management source to store the electronic data. In contrast, the watermarking scheme does not require the management source to store the electronic data. Because of these advantages, the watermarking scheme in which electronic data is embedded and used as a watermark in a sheet of paper would become more popular in the future.

The technique of printing the above-described watermark image has an advantage that a person reading the sheet (hereinafter referred to as a "reader") can obtain the electronic data from the sheet. However, the technique does not have an advantage of paper in that the information is directly and visually presented to the reader. To overcome the disadvantage, content equivalent to that of an electronic file stored in the watermark image may be printed on the sheet in such a format that the reader can read. When the electronic data is contained on the sheet in these two ways, that is, being printed so as to be readable by the reader and being embedded as a watermark, the convenience of both the electronic file and the paper can be inherited. However, the risk of information leakage becomes higher in both ways. If the information may be personal information or the like that requires secrecy, measures must be taken to avoid information leakage while ensuring the convenience of handling information.

Information printed on a sheet of paper can directly stimulate the vision of a reader. However, such information printed on the sheet is difficult to edit. In contrast, an electronic file produces less visual impact on the reader than paper, but can be easily edited. Unless the electronic file is opened using an application program, the information will not be leaked to the outside.

In the case that the details of information printed on a sheet of paper include secret information shared in advance by a printing source and a user, the following cannot be implemented by known techniques. That is, it has been difficult to prevent secret information from leaking even in the case that a printed side of the sheet is presented to people other than the user, and to prevent the user from entering the secret information again when editing an electronic file obtained from the watermark.

SUMMARY OF THE INVENTION

The present invention utilizes advantages of both a printed matter and electronic data. Information to be contained on a sheet of paper is divided into secret information and public information. The public information is information whose content is to be made public on the sheet, whereas the secret information is to be embedded in the sheet as watermark image data serving as reversibly convertible electronic data. Print data based on a portion including the public information and a portion including the secret information is generated on the same sheet, whereby a printed matter is printed.

Accordingly, the information on the sheet is prevented from leaking out, and the convenience of paper can also be ensured. Advantages of both the printed matter and the electronic data can be fully utilized.

According to an aspect of the present invention, there is provided a print controlling apparatus generating print data for performing variable printing of differing print contents, the apparatus including a template-obtaining unit configured to obtain a template, a variable-information-obtaining unit configured to obtain variable information, a watermark-printing-specifying unit configured to specify whether to perform watermark printing, an item-specifying unit configured to specify an item to be watermark-printed and an item to be printed normally based on the variable information, a normal-image-data-generating unit configured to generate image data to be printed normally, a watermark-image-data-generating unit configured to generate watermark image data to be watermark-printed, and a print-data-output unit configured to output image data for print output.

When watermark printing is specified by the watermark-printing-specifying unit, the item-specifying unit specifies an item to be watermark-printed and an item to be printed normally based on the variable information, the normal-image-data-generating unit generates first image data to be printed normally based on the template obtained by the template-obtaining unit and the item specified by the item-specifying unit to be printed normally, the watermark-image-data-generating unit generates watermark image data based on the item specified by the item-specifying unit to be watermark-printed, and the print-data generating unit combines the first image data to be printed normally, and the watermark image data, and outputs the combined image data as image data for print output.

When no watermark printing is specified, the normal-image-data-generating unit generates second image data to be printed normally based on the template obtained by the template-obtaining unit and the variable information obtained by the variable information obtaining unit, and the print-data-output unit outputs the second image data to be printed normally, as image data for print output.

Other features and advantages of the present invention will be apparent from the following description taken in conjunction with the accompanying drawings, in which like reference numerals designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a conceptual diagram illustrating exemplary protected information stored in a database according to the first embodiment.

FIG. 3 is a block diagram of an exemplary internal structure of a personal computer according to the first embodiment.

FIG. 5 illustrates an exemplary user interface (UI) screen displayed on a display in response to an instruction to start printing according to the first embodiment.

FIG. 6 illustrates an exemplary relationship among a template, protected information, and a combined image in the case that the protected information is to be watermark-printed according to the first embodiment.

FIG. 7 illustrates an exemplary relationship among a template, protected information, and a combined image in the case that both the template and the protected information are to be watermark-printed according to the first embodiment.

FIG. 8 is a flowchart of exemplary operation of the personal computer when obtaining electronic data from a printed matter according to the first embodiment.

FIG. 9 illustrates an exemplary relationship among scanned image data received from a scanner, image data obtained by removing watermark image data from the scanned image data, information in an electronic file extracted from the watermark image data, the edited result of the information in the electronic file, and an image according to the first embodiment.

FIG. 10 is a block diagram of an exemplary internal structure of a multifunctional apparatus according to a second embodiment of the present invention.

FIG. 13 is a flowchart of exemplary operation of a personal computer provided at a client side according to the third embodiment.

FIG. 14 illustrates a first example of the UI screen displayed on the display according to the third embodiment.

FIG. 15 illustrates a second example of the UI screen displayed on the display according to the third embodiment.

FIGS. 16A and 16B flowcharts of an exemplary operation of a prepress unit according to the third embodiment.

DESCRIPTION OF THE EMBODIMENTS

Exemplary embodiments of the present invention will now be described in detail in accordance with the accompanying drawings.

In the following embodiments, the technique of converting electronic data into a reversibly convertible two-dimensional image and the technique of reconverting the two-dimensional image into the electronic data are used. Many methods are available to implement the techniques.

All pieces of data in an electronic file are represented by binary numbers. The binary numbers (0, 1) correspond to white and black of an image. The binary numbers are losslessly compressed and encoded using a table of conversion from a modified-modified-read (MMR) image into transmission data, which is used in facsimile transmission defined by T6 of International Telecommunication Union-Telecommunication Standardization Sector (ITU-T). The losslessly compressed, encoded data sequence is regarded as image data in a black-white multi-value mode (e.g., 8-bit image data) and is converted into image data. The image data is printed as an image. Accordingly, the electronic file is converted into the image printed on the sheet. In the following description, such conversion of electronic data into a two-dimensional image is referred to as conversion of electronic data into a watermark, as needed.

An image printed on a sheet of paper is scanned by a scanner or the like to generate image data in the black-white multi-value mode. Please note that for description purposes, reference will be made to a sheet of paper. However, the present invention is not restricted to the use of paper, and any type of recording medium that would enable practice of the present invention is applicable.

The generated image data is regarded as a binary bit sequence and is converted into binary data using a table of conversion from MMR transmission data into an image, which is used in facsimile transmission defined by T6 of ITU-T. The converted binary data sequence is regarded as, for example, byte data and is converted into an electronic file. In the following description, such conversion of a two-dimensional image into electronic data is referred to as conversion of a watermark into electronic data, as needed.

In the embodiments described below, the above-mentioned conversion of electronic data into a watermark and the above-mentioned conversion of a watermark into electronic data are used. Because known methods can be used to implement algorithms for converting electronic data into a watermark and converting a watermark into electronic data, a detailed description thereof is omitted.

Figure 1:
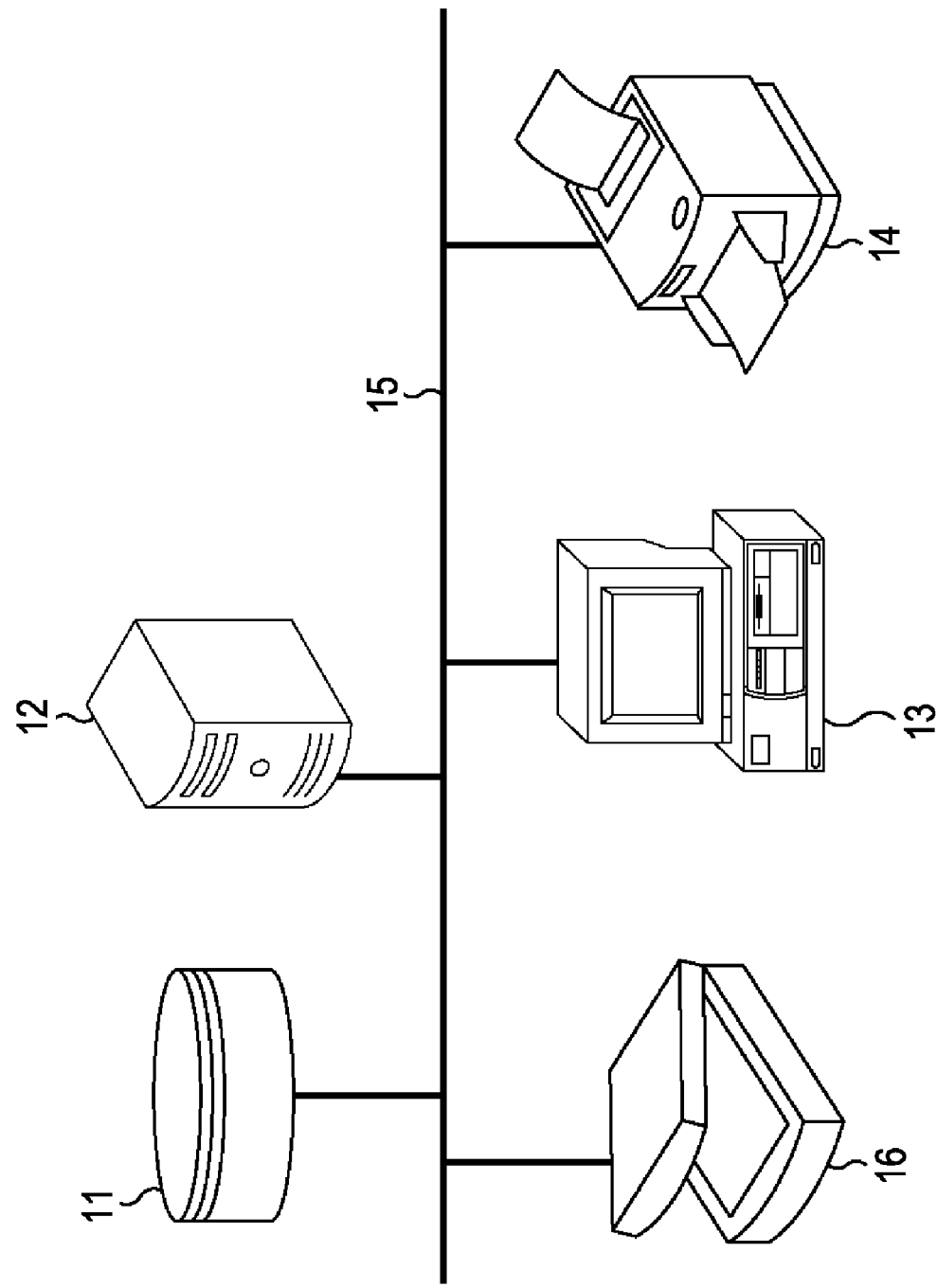
FIG. 1 is a diagram illustrating an exemplary schematic structure of hardware in a print system according to a first embodiment of the present invention.

FIG. 1 illustrates an exemplary schematic structure of hardware in a print system according to a first embodiment of the present invention.

Referring to FIG. 1, the print system includes a database 11, a file server 12, a personal computer 13, a printer 14, a network 15, and a scanner 16.

The database 11 and the file server 12 each have a storage medium capable of storing a file. In the case that an access request, such as a request to read or write a file, is given from an external apparatus via the network 15, the database 11 and the file server 12 each operate the file stored in the storage medium in accordance with the access request.

In the present embodiment, the database 11 stores an electronic file including secret information required to be protected. In the following description, this secret information is referred to as "protected information". FIG. 2 is a conceptual diagram illustrating exemplary protected information (file format and content) stored in the database 11.

The file server 12 stores an electronic file including information without secrecy. In the following description, this information without secrecy is referred to as "template".

The printer 14 prints an image on a sheet on the basis of received print data. The scanner 16 scans an image on a sheet, converts the scanned image into image data, and sends the image data to the personal computer 13. In FIG. 1, the case in which the scanner 16 is connected to the network 15 has been described by way of example. However, the scanner 16 may be connected only to the personal computer 13.

FIG. 3 is a block diagram of an exemplary internal structure of the personal computer 13.

Referring to FIG. 3, a central processing unit (CPU) 1 manages and controls the personal computer 13. A random-access memory (RAM) 2 provides a work area for the CPU 1. A hard disk 3 stores programs executed by the CPU 1 and various data. Instead of the hard disk 3 or in addition to the hard disk 3, a floppy disk, a non-volatile RAM (NVRAM), or a digital versatile disk (DVD) may be used. A user-command input unit 5 is a unit configured to allow entry of various settings by a user via a graphical user interface (GUI).

A display unit 6 includes, for example, a liquid crystal display (LCD) and performs a display operation based on GUI or the like. A communication unit 7 is a unit configured to perform communication with the network 15. A watermark/electronic-data converter 9 is a unit configured to convert electronic data into electronic watermark image data or to convert electronic watermark image data into electronic data. The CPU 1, the RAM 2, the hard disk 3, the user-command input unit 5, the display unit 6, the communication unit 7, and the watermark/electronic-data converter 9 are connected to one another via a main bus 8.

In the following description, unless otherwise stated, the CPU 1 implements processing of the personal computer 13 by controlling the RAM 2, the hard disk 3, the user-command input unit 5, the display unit 6, the communication unit 7, and the watermark/electronic-data converter 9 via the main bus 8.

Figure 4A:
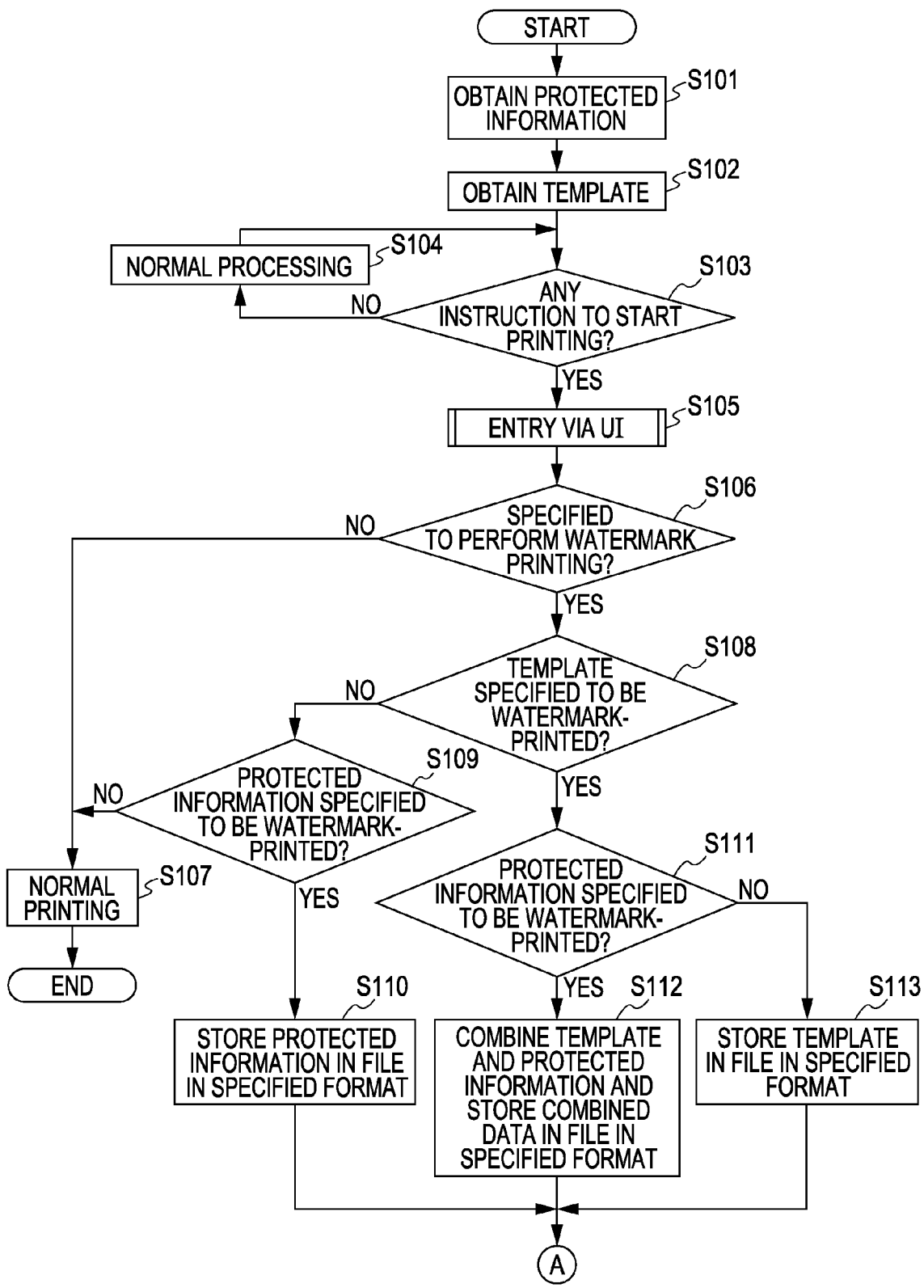
FIGS. 4A and 4B are flowcharts of an exemplary operation of the personal computer when printing image data including a watermark image according to the first embodiment.
Figure 4B:
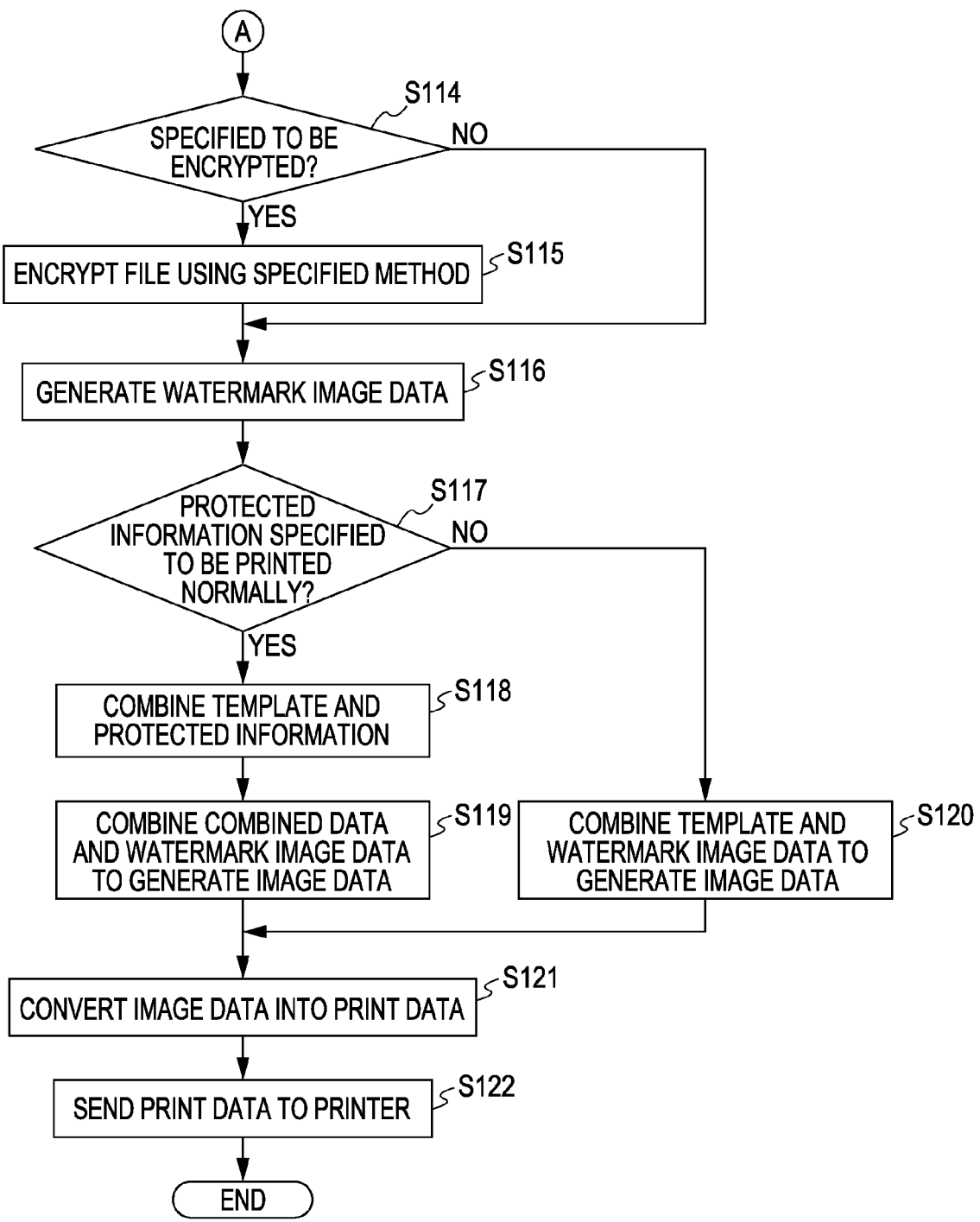

Referring to the flowcharts illustrated in FIGS. 4A and 4B, an exemplary operation of the personal computer 13 when printing image data including a watermark image will be described.

After initiation of a program stored in the hard disk 3 of the personal computer 13, the CPU 1 uses the communication unit 7 to access the database 11. The CPU 1 obtains an electronic file storing protected information specified in advance by a user by operating the user-command input unit 5 from the database 11 via the network 15 (step S101).

Next, the CPU 1 uses the communication unit 7 to access the file server 12. The CPU 1 obtains an electronic file storing a template specified in advance by the user by operating the user-command input unit 5 from the file server 12 via the network 15 (step S102).

Next, the CPU 1 determines whether an instruction to start printing has been entered from the user-command input unit 5 (step S103). When the determination result indicates that no instruction has been given to start printing, the CPU 1 performs normal processing (step S104) and repeats the processing in step S103.

When an instruction to start printing has been given, the CPU 1 allows the display unit 6 to display a user interface screen (hereinafter referred to as a "UI screen"). The CPU 1 waits until completion of entry of an instruction from the user-command input unit 5 (step S105).

FIG. 5 illustrates an exemplary UI screen displayed on the display unit 6 in response to an instruction to start printing. The user can specify whether to perform watermark printing by operating the user-command input unit 5 in accordance with a UI screen 50 illustrated in FIG. 5. In the case of watermark printing, the user can specify whether to perform watermark printing or normal printing of the template and the protected information by operating the user-command input unit 5 in accordance with the UI screen 50. Further, in the case of watermark printing, the user can specify whether to encrypt a watermark portion by operating the user-command input unit 5 in accordance with the UI screen 50.

Turning back to FIG. 4A, the CPU 1 determines whether the watermark printing has been specified based on the user operation entered by operating the user-command input unit 5 in accordance with the UI screen 50 (step S106). When the determination result indicates that no watermark printing has been specified, the CPU 1 determines that a normal print request has been issued and performs normal printing (step S107), and the operation flow ends.

When the watermark printing has been specified, the CPU 1 determines whether the template has been specified to be watermark-printed (step S108). When the determination result indicates that the template has not been specified to be watermark-printed, the CPU 1 determines whether the protected information has been specified to be watermark-printed (step S109). When the determination result indicates that the protected information has not been specified to be watermark-printed, no information will be watermark-printed. Thus, the CPU 1 performs normal printing (step S107), and the operation flow ends.

In the case that the protected information has been specified in step S109 to be watermark-printed, the CPU 1 stores the protected information in a file in a file format specified by the user on the UI screen 50 (step S110). Then, the operation flow proceeds to step S114, which will be described below. FIG. 6 illustrates an exemplary relationship among the template, the protected information, and a combined image in the case that the protected information is to be watermark-printed.

In the case that the template has been specified in step S108 to be watermark-printed, the CPU 1 determines whether the protected information has been specified to be watermark-printed (step S111). When the determination result indicates that the protected information has been specified to be watermark-printed, the CPU 1 determines to perform watermark printing of both the template and the protected information. The CPU 1 combines the template and the protected information to generate combined image data and stores the combined image data in a file in a file format specified by the user on the UI screen 50 (step S112). Then, the operation flow proceeds to step S114, which will be described below. FIG. 7 illustrates an exemplary relationship among the template, the protected information, and a combined image in the case that both the template and the protected information are to be watermark-printed.

In the case that the protected information has not been specified in step S111 to be watermark-printed, the operation flow proceeds to step S113. The CPU 1 stores the template in a file in a file format specified by the user on the UI screen 50 (step S113).

In the above-described manner, information to be watermark-printed is stored in a file in a file format specified by the user, and the CPU 1 determines whether a portion to be watermark-printed is specified to be encrypted (step S114). When the determination result indicates that the portion to be watermark-printed is specified to be encrypted, the CPU 1 encrypts the file using an encryption method specified by the user on the UI screen 50 (step S115).

Various methods, such as symmetric key encryption or asymmetric key encryption, may be employed as the encryption method. Since known techniques can be used as the specific encryption method, a detailed description thereof is omitted.

Next, the CPU 1 activates the watermark/electronic-data converter 9. The watermark/electronic-data converter 9 converts the file generated in step S110, S112, or S113 into watermark image data (step S116).

Next, the CPU 1 determines whether the protected information has been specified to be printed normally (step S117). When the determination result indicates that the protected information has been specified to be printed normally, the CPU 1 combines the template and the protected information (step S118) to generate combined data. The CPU 1 further combines the combined data generated in step S118 and the watermark image data generated in step S116 to generate image data (step S119).

In the case that the protected information has not been specified in step S117 to be printed normally, the CPU 1 combines the template and the watermark image data to generate image data (step S120).

As illustrated in FIG. 6, in the case that protected information 61 is to be watermark-printed, combined image data 63 is generated such that a template 62 can be printed normally and the protected information 61 can be watermark-printed. In contrast, as illustrated in FIG. 7, in the case that data 73 generated by combining protected information 71 and a template 72 is to be watermark-printed, combined image data 74 is generated such that the template 72 can be printed normally and the data 73 including the protected information 71 and the template 72 can be watermark-printed.

In the case that image data is generated in the above-described manner, the CPU 1 converts the generated image data into print data that can be printed by the printer 14 (step S121). The CPU 1 sends the print data generated in step S121 to the printer 14 via the communication unit 7 (step S122), and the operation flow ends.

Upon reception of the print data from the personal computer 13, the printer 14 executes printing based on the received print data and ejects a printed matter.

Referring to the flowchart illustrated in FIG. 8, exemplary operation of the personal computer 13 when obtaining electronic data from a printed matter will be described.

After initiating a program stored in the hard disk 3 of the personal computer 13, the CPU 1 waits for reception of image data from the scanner 16 via the communication unit 7 (step S201).

Upon reception of the image data, the CPU 1 analyzes the received image data (step S202). Based on the analysis result, the CPU 1 determines whether the received image data includes watermark image data (step S203). When the determination result indicates that the received image data includes no watermark image data, the CPU 1 performs normal reception processing (step S204) and then repeats the processing in step S201.

When the received image data includes watermark image data, the CPU 1 activates the watermark/electronic-data converter 9. The watermark/electronic-data converter 9 converts the watermark image data into an electronic file (step S205).

Next, the CPU 1 determines whether the electronic file generated in step S205 is an encrypted file (step S206). When the determination result indicates that the electronic file generated in step S205 is an encrypted file, the CPU 1 decrypts the file (step S207). Since known techniques can be used to perform the specific decryption, a detailed description thereof is omitted.

The CPU 1 displays the content of the electronic file on the display unit 6 (step S208). Next, the CPU 1 determines whether a request to change the electronic file whose content has been displayed on the display unit 6 has been entered from the user-command input unit 5 (step S209). When the determination result indicates that a request to change the electronic file whose content has been displayed on the display unit 6 has been entered from the user-command input unit 5, the CPU 1 waits for completion of the change of the electronic file (step S210). The CPU 1 saves the electronic file in, for example, the hard disk 3 (step S211).

Next, the CPU 1 determines whether a request to generate a combined image has been entered from the user-command input unit 5 (step S212). When the determination result indicates that no request to generate a combined image has been entered, the CPU 1 repeats the processing in step S201.

When a request to generate a combined image has been entered, the CPU 1 generates an image of the electronic file saved in step S211 (step S213). Next, the CPU 1 removes the watermark image data portion from the image data determined to have been received in step S201 (step S214). More specifically, the CPU 1 removes the watermark image data portion by filling the watermark image data portion with the same color as the sheet (e.g., white) or the like.

Next, the CPU 1 combines the image of the electronic file and an image of the image data from which the watermark image data has been removed to generate an image (step S215). The CPU 1 saves the generated image in, for example, the hard disk 3 (step S216) and repeats the processing in step S201.

FIG. 9 illustrates an exemplary relationship among scanned image data received from the scanner 16, image data obtained by removing watermark image data from the scanned image data, information in an electronic file extracted from the watermark image data, the edited result of the information in the electronic file, and an image.

As illustrated in FIG. 9, image data 92 is generated by removing watermark image data from image data 91 received from the scanner 16. Watermark image data (protected information) 93 that has been converted into an electronic file is edited (changed) to generate edited information 94. The image data 92 and the edited information 94 are combined to generate an image 95.

As has been described above, according to the present embodiment, for example, when placing information including secret information shared by a printing source and a user on a sheet of paper, the information to be placed on the sheet is separated in advance into the secret information and public information. The public portion will be printed, and the secret portion will be embedded as electronic watermark data. Print data based on the public portion and the secret portion is generated on the same sheet and printed to generate a printed matter.

In the case that the printed matter is scanned by the scanner 16, if watermark image data exists, the watermark image data is analyzed to extract secret information, and the scanned public information and the extracted secret information are combined to generate the image 95, which is then saved. In the case that the printed matter is scanned by the scanner 16, if watermark image data exists, the watermark image data is converted into an electronic file, and the electronic file (the protected information 93) is displayed on the display unit 6 to allow editing by the user.

Accordingly, a print system that utilizes advantages of a printed matter and advantages of electronic data can be provided. More specifically, direct presentation of information to stimulate the vision of a reader, as in normal printing, and easy editing of information can be implemented. Further, while the secret information can be edited easily, the secret information can be prevented from leaking visually. Thus, the information providing method that can prevent information contained on paper from leaking and ensure the convenience of paper (both the security and convenience) can be implemented easily using paper, which is a medium that can be distributed at low cost.

For example, in the case that secret information shared by a printing source and a user is provided as watermark image data, applications thereof to insurance campaigns using direct mail by postcard and to address-change request forms can be expected. Since the secret portion is encrypted in the present embodiment, the possibility of leakage of the information is further reduced.

Although the protected information 61 and 71 may not necessarily be watermark-printed on every occasion in the present embodiment, the protected information 61 and 71 may be specified to be watermark-printed on every occasion. In this case, the processing in steps S111 and S113 is not performed.

In the present embodiment, generation of print data and processing of image data scanned by the scanner 16 are performed in the personal computer 13. However, generation of print data and processing of image data scanned by the scanner 16 may be performed by different apparatuses. That is, different apparatuses may be configured to perform the process illustrated in the flowcharts of FIGS. 4A and 4B, and the process illustrated in the flowchart of FIG. 8. In this case, two systems can be configured. More specifically, a first system includes the database 11, the file server 12, the personal computer 13, and the printer 14, which are connected to one another via the network 15. A second system includes the personal computer 13 and the scanner 16, which are connected to each other via the network 15.

A second embodiment of the present invention will now be described. In the above-described embodiment, the case in which a printed matter is scanned by the scanner 16 has been described by way of example. In contrast, in the present embodiment, a printed matter is processed by a multifunctional apparatus.

The difference between the present embodiment and the previous embodiment is mainly in the method of processing a printed matter. In a description of the present embodiment, the same components as those of the previous embodiment are denoted by the same reference numerals as in FIGS. 1 through 9, and thus, detailed descriptions thereof are omitted.

FIG. 10 is a block diagram of an exemplary internal structure of a multifunctional apparatus. As will be described below, the multifunctional apparatus includes a scan function, a print function, a copy function, a network function, and the like. The multifunctional apparatus automatically sends electronic data generated from watermark image data to an address specified in advance by a user. The multifunctional apparatus is connected to, for example, the network 15 illustrated in FIG. 1.

Referring to FIG. 10, a CPU 101 manages and controls the multifunctional apparatus. A RAM 102 provides a work area for the CPU 101. A hard disk 103 stores programs executed by the CPU 1 and various data. Instead of the hard disk 3 or in addition to the hard disk 3, a floppy disk, an NVRAM, or a DVD may be used. A user-command input unit 105 is a unit configured to allow entry of various settings by a user via a GUI.

A display unit 106 includes, for example, an LCD and performs a display operation based on GUI or the like. A communication unit 107 is a unit configured to perform communication with the network 15. A watermark/electronic-data converter 109 is a unit configured to convert electronic data into electronic watermark image data or to convert electronic watermark image data into electronic data. A printer 111 is a unit configured to print on paper or the like. A scanner 112 is a unit configured to scan an image on a sheet of paper and generate image data.

The CPU 101, the RAM 102, the hard disk 103, the user-command input unit 105, the display unit 106, the communication unit 107, the watermark/electronic-data converter 109, the printer 111, and the scanner 112 are connected to one another via a main bus 108.

In the following description, unless otherwise stated, the CPU 101 implements processing of the multifunctional apparatus by controlling the RAM 102, the hard disk 103, the user-command input unit 105, the display unit 106, the communication unit 107, the watermark/electronic-data converter 109, the printer 111, and the scanner 112, which are connected to the main bus 108.

Figure 11A:
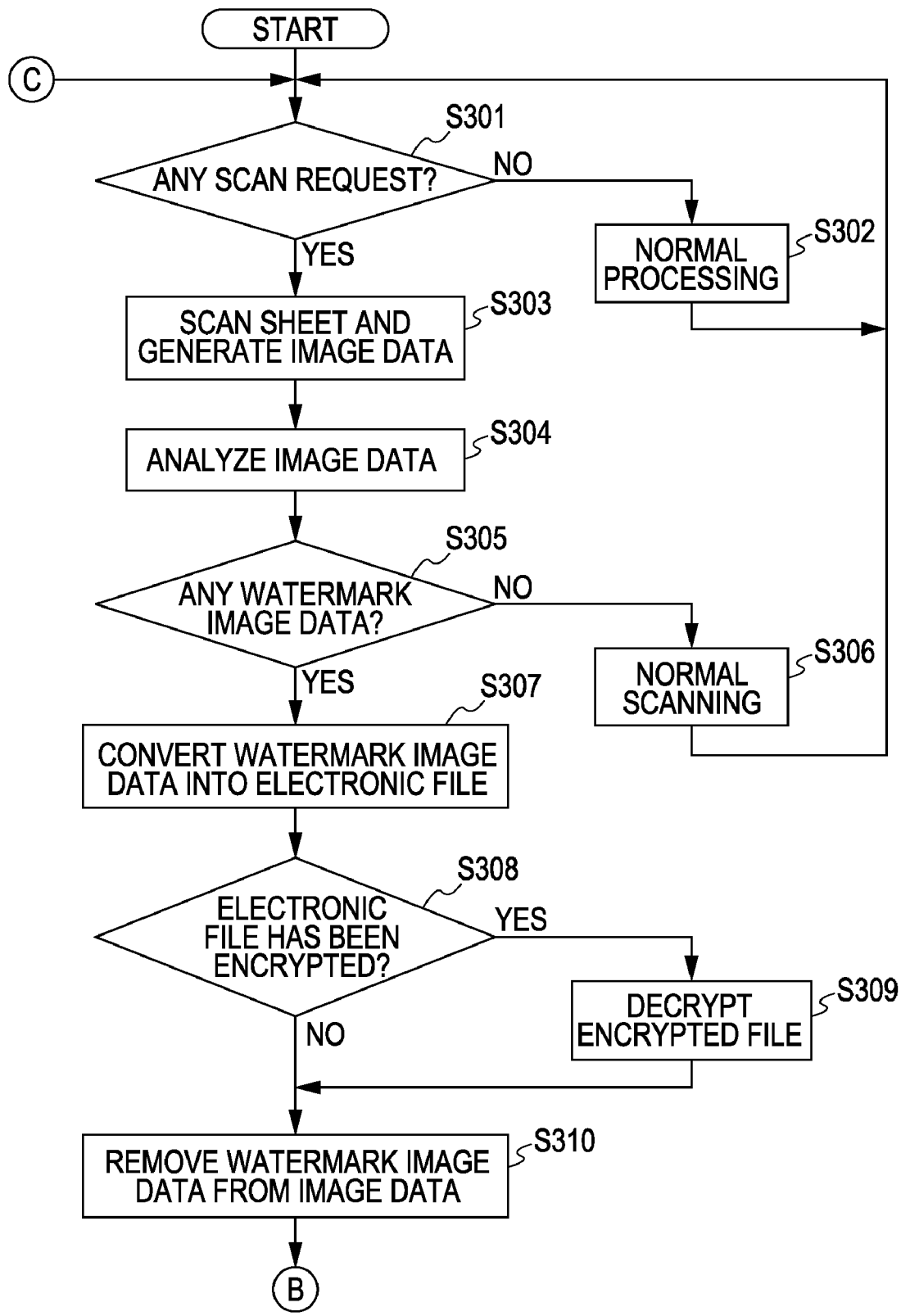
FIGS. 11A and 11B are flowcharts of exemplary operation of the multifunctional apparatus according to the second embodiment.
Figure 11B:
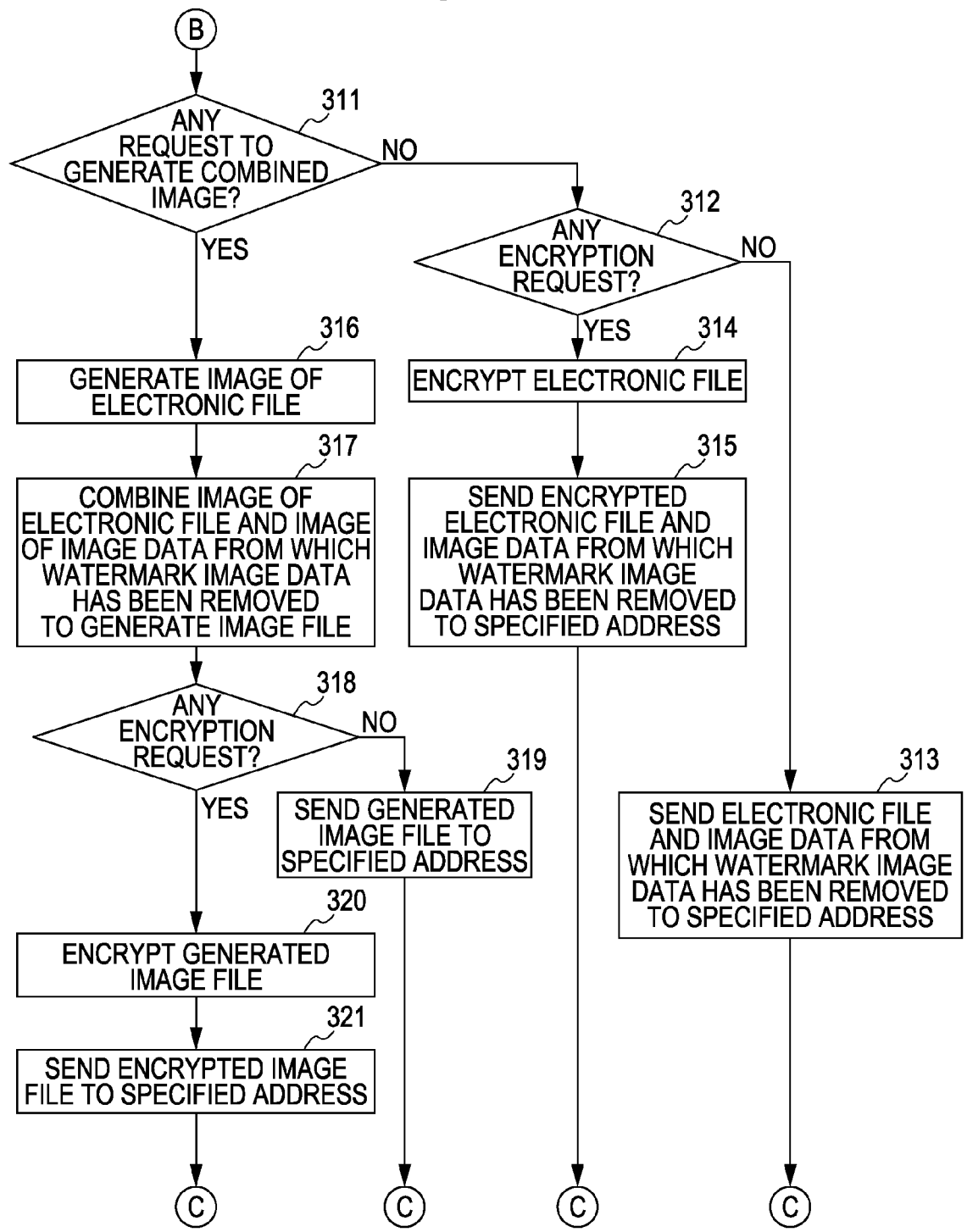

Referring to the flowcharts illustrated in FIGS. 11A and 11B, an exemplary operation of the multifunctional apparatus will be described.

After initiation of a program stored in the hard disk 103 of the multifunctional apparatus, the CPU 101 waits for a request to scan a sheet to be given to the scanner 112 (step S301). In the case that no request to scan a sheet has been given to the scanner 112, the CPU 101 performs normal processing (step S302) and repeats the processing in step S301.

In contrast, in the case that a request to scan a sheet has been given to the scanner 112, the CPU 101 gives an instruction to scan the sheet to the scanner 112. Accordingly, the scanner 112 scans the sheet and generates image data (step S303). Once the image data has been generated, the CPU 101 analyzes the generated image data (step S304).

Next, the CPU 101 determines whether the image data includes watermark image data (step S305). When the determination result indicates that the image data includes no watermark image data, the CPU 101 performs normal scanning processing (step S306) and repeats the processing in step S301.

When the image data includes watermark image data, the CPU 101 activates the watermark/electronic-data converter 109. The watermark/electronic-data converter 109 converts the watermark image data into an electronic file (step S307).

Next, the CPU 101 determines whether the electronic file generated in step S307 is an encrypted file (step S308). When the determination result indicates that the electronic file generated in step S307 is an encrypted file, the CPU 101 decrypts the file (step S309). Since known techniques can be used to perform the specific decryption, a detailed description thereof is omitted.

The CPU 101 removes the watermark image data portion from the image data generated in step S303 (step S310). More specifically, the CPU 101 removes the watermark image data portion by filling the watermark image data portion with the same color as the sheet (e.g., white) or the like.

Next, the CPU 101 determines whether a request to generate a combined image has been entered from the user-command input unit 105 (step S311). When the determination result indicates that no request to generate a combined image has been entered, the CPU 101 determines whether a request has been given from the user to encrypt the image file at the time the image file has been sent (step S312). The user gives such a request by operating the user-command input unit 105 in accordance with a GUI displayed on the display unit 106.

When the determination result indicates that a request has been given to encrypt the image file, the CPU 101 encrypts the electronic file generated in step S307 (step S314). Since known techniques can be used to perform the specific encryption, a detailed description thereof is omitted.

Next, the CPU 101 sends the electronic file encrypted in step S314 and the image data generated by removing the watermark image data in step S310 to an address specified in advance by the user via the communication unit 107 (step S315), and the CPU 101 repeats the processing in step S301. The user specifies the address by operating the user-command input unit 105 in accordance with a GUI displayed on the display unit 106.

In the case that no request has been given to encrypt the image file in step S312, the flow proceeds to step S313. The CPU 101 sends the electronic file generated in step S307 and the image data generated by removing the watermark image data in step S310 to an address specified in advance by the user via the communication unit 107 (step S313). The CPU 101 then repeats the processing in step S301.

In the case that a request to generate a combined image has been given in step S311, the CPU 101 generates an image of the electronic file (step S316). The CPU 101 combines the image of the electronic file and an image of the image data from which the watermark image data has been removed to generate an image and converts the generated image into a file, thereby generating an image file (step S317).

Next, the CPU 101 determines whether a request has been given from the user to encrypt the image file at the time the image file has been sent (step S318). When the determination result indicates that a request has been given to encrypt the image file, the CPU 101 encrypts the image file generated in step S317 (step S320). The user gives such a request by operating the user-command input unit 105 in accordance with a GUI displayed on the display unit 106.

Next, the CPU 101 sends the encrypted image file to an address specified in advance by the user via the communication unit 107 (step S321). The CPU 101 then repeats the processing in step S301.

In the case that no request has been given to encrypt the image file in step S318, the CPU 101 sends the image file generated in step S317 to an address specified in advance by the user via the communication unit 107 (step S319). The CPU 101 then repeats the processing in step S301. As has been described above, according to the present embodiment, image data based on a printed matter is scanned by the scanner 112. The multifunctional apparatus sends image data including watermark image data included in the scanned image data to an address (apparatus) specified in advance by the user. Therefore, in addition to the advantages described in the previous embodiment, the image data including the watermark image data can be automatically stored in a place as desired by the user. As in the previous embodiment, the content of the electronic file may be edited (changed) in accordance with a request from the user.

According to a third embodiment of the present invention, the case of performing mass printing (variable printing) referred to as "print on demand" (POD) will be described. The third embodiment is different from the above-described embodiments mainly in the printing mechanism. In a description of the present embodiment, the same components as those of the previous embodiments are denoted by the same reference numerals as in FIGS. 1 through 11, and detailed descriptions thereof are omitted.

Figure 12:
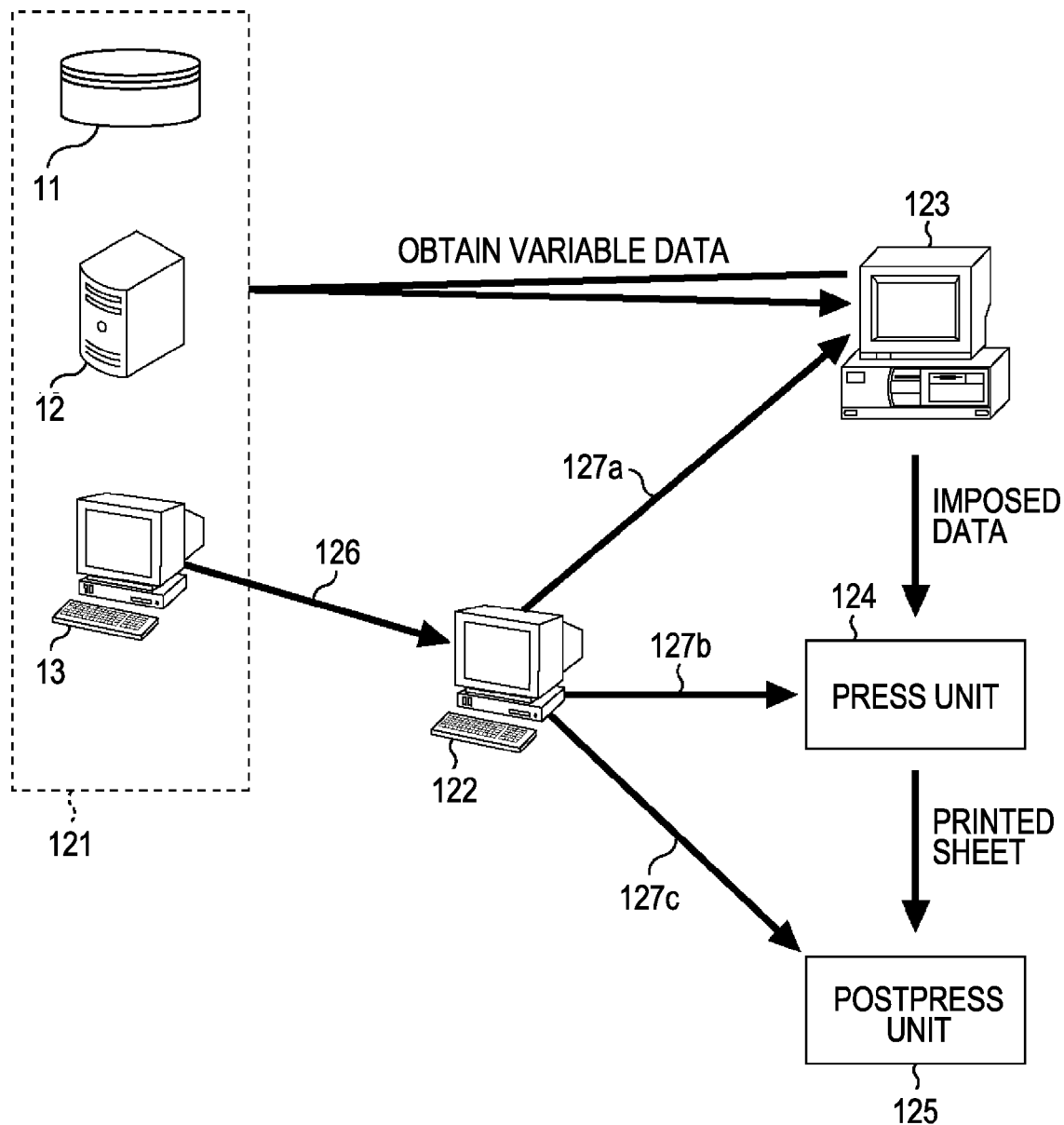
FIG. 12 is a diagram illustrating an exemplary structure of a print system for implementing "print on demand" (POD) according to a third embodiment of the present invention.

FIG. 12 illustrates an exemplary structure of a print system for implementing POD. In FIG. 12, the database 11, the file server 12, the personal computer 13, a management information system (MIS) 122, and a prepress unit 123 are connected to one another via a network.

With continued reference to FIG. 12, a client 121 specifies data to print and a printing method and provides a print request. The client 121 includes the database 11, the file server 12, and the personal computer 13. The MIS 122 specifies printing steps and manages printing. The MIS 122 is implemented using, for example, the personal computer illustrated in FIG. 3.

The prepress unit 123 is a unit configured to impose a print side and to generate imposed print data in accordance with the printing steps specified by the MIS 122. The prepress unit 123 is implemented using, for example, the personal computer illustrated in FIG. 3. A press unit 124 is a printer configured to receive the imposed print data generated by the prepress unit 123 and to perform printing based on the received print data in accordance with the printing steps specified by the MIS 122. A postpress unit 125 is a processor configured to cut, trim, bind, etc. sheets of paper printed by the press unit 124 in accordance with the printing steps specified by the MIS 122.

More specifically, the MIS 122 receives a set of instructions referred to as a job description format (JDF) 126 from the personal computer 13 included in the client 121. In accordance with the received JDF 126, the MIS 122 instructs the prepress unit 123, the press unit 124, and the postpress unit 125 to execute printing steps 127a to 127c by sending the JDF 126. The printing steps 127a to 127c include information regarding the location of variable information stored in the database 11 and information regarding the location of a template stored in the file server 12. The variable information is, for example, secret information regarding individuals. The template is, for example, an electronic file including information without secrecy.

In accordance with the printing step (JDF) 127a specified by the MIS 122, the prepress unit 123 generates imposed print data and transfers the print data to the press unit 124. In accordance with the printing step (JDF) 127b specified by the MIS 122, the press unit 124 prints the print data, which has been transferred from the prepress unit 123 and which has been imposed, on a sheet of paper. In accordance with the printing step (JDF) 127c specified by the MIS 122, the postpress unit 125 processes a printed sheet transferred from the press unit 124.

The manner in which the client 121 specifies data to print and a printing method and the manner in which the prepress unit 123 generates imposed print data in accordance with the specified print data and printing method is described below. Since known techniques can be used for the operation of the MIS 122, the press unit 124, and the postpress unit 125, detailed descriptions thereof are omitted.

The database 11 and the file server 12 each have a storage medium capable of storing a file. In the case that an access request, such as a request to read or write a file, is given from an external apparatus via the network, the database 11 and the file server 12 each operate the file stored in the storage medium in accordance with the access request.

In the present embodiment, the database 11 stores variable information, and the file server 12 stores a template. The file format and content of the variable information are, for example, the same as those illustrated in FIG. 2.

Referring to the flowchart illustrated in FIG. 13, an exemplary operation of the personal computer 13 included in the client 121 according to the present embodiment will be described.

After initiation a program stored in the hard disk 3 of the personal computer 13, the CPU 1 determines whether a request for variable printing has been entered from the user-command input unit 5 (step S401). When the determination result indicates that no request for variable printing has been given, the CPU 1 performs normal printing (step S402) and repeats the processing in step S401.

When a request for variable printing has been given, the CPU 1 waits for the user-command input unit 5 to specify a URL indicating the storage location of a file including the template (step S403). In the case that a URL indicating the storage location of a file including the template is specified, the CPU 1 waits for the user-command input unit 5 to specify a URL indicating the storage location of a file including the variable information (step S404).

In the case that a URL indicating the storage location of a file including the variable information is specified, the CPU 1 waits for the user-command input unit 5 to specify the numbers (print start number and print end number) of the variable information to be printed (step S405).

The determinations in steps S403, S404, and S405 are made, for example, based on the results of operations entered by operating the user-command input unit 5 in accordance with a user interface 1400 illustrated in FIG. 14.

Once the print start and end numbers of the variable information have been specified, the CPU 1 determines whether watermark printing has been specified from the user-command input unit 5 (step S406). When the determination result indicates that no watermark printing has been specified, the CPU 1 performs normal variable printing (step S407) and repeats the processing in step S401. In the case that watermark printing has been specified, the CPU 1 waits for completion of specification of items to be watermark-printed (step S408).

When specification of items to be watermark-printed is completed, the CPU 1 determines whether all the items other than the items to be watermark-printed have been specified as items to be printed normally (step S409). When the determination result indicates that all the items other than the items to be watermark-printed are specified as items to be printed normally, the flow proceeds to step S411. The CPU 1 sets all the items, including the template, other than the items specified to be watermark-printed as items to be printed normally (step S411). Then, the flow proceeds to step S412.

In the case that not all the items other than the items to be watermark-printed are specified as items to be printed normally, the CPU 1 waits for completion of specification of items to be printed normally (step S410). When specification of items to be printed normally is completed, the flow proceeds to step S412.

In step S412, the CPU 1 determines whether a portion to be watermark-printed is specified by the user-command input unit 5 to be encrypted. When the determination result indicates that the portion to be watermark-printed is specified to be encrypted, the CPU 1 performs settings to encrypt the portion to be watermark-printed (step S413).

The determinations in steps S406, S408 through S410, and S412 are made, for example, based on the results of operations entered by operating the user-command input unit 5 in accordance with a user interface 1500 illustrated in FIG. 15.

The CPU 1 generates the JDF 126 including the specified details and sends the generated JDF 126 to the MIS 122 via the communication unit 7 (step S414). Then, the flow returns to step S401. The JDF 126 includes at least the following types of information:

(1) URL of the file including the template;

(2) URL of the file including the variable information;

(3) print start and end numbers of the variable information;

(4) specification whether to perform watermark printing (5) items to be watermark-printed (list of actual item names);

(6) items to be printed normally; and (7) specification whether to encrypt portion to be watermark-printed.

The MIS 122 receives the JDF 126 sent in this manner from the personal computer 13. In accordance with the details described in the JDF 126, the MIS 122 sends the printing steps 127a to 127c describing necessary information in a JDF to the prepress unit 123, the press unit 124, and the postpress unit 125. The content of the JDF sent to the prepress unit 123 includes at least the above-described pieces of information (1) through (7).

Figure 16A:
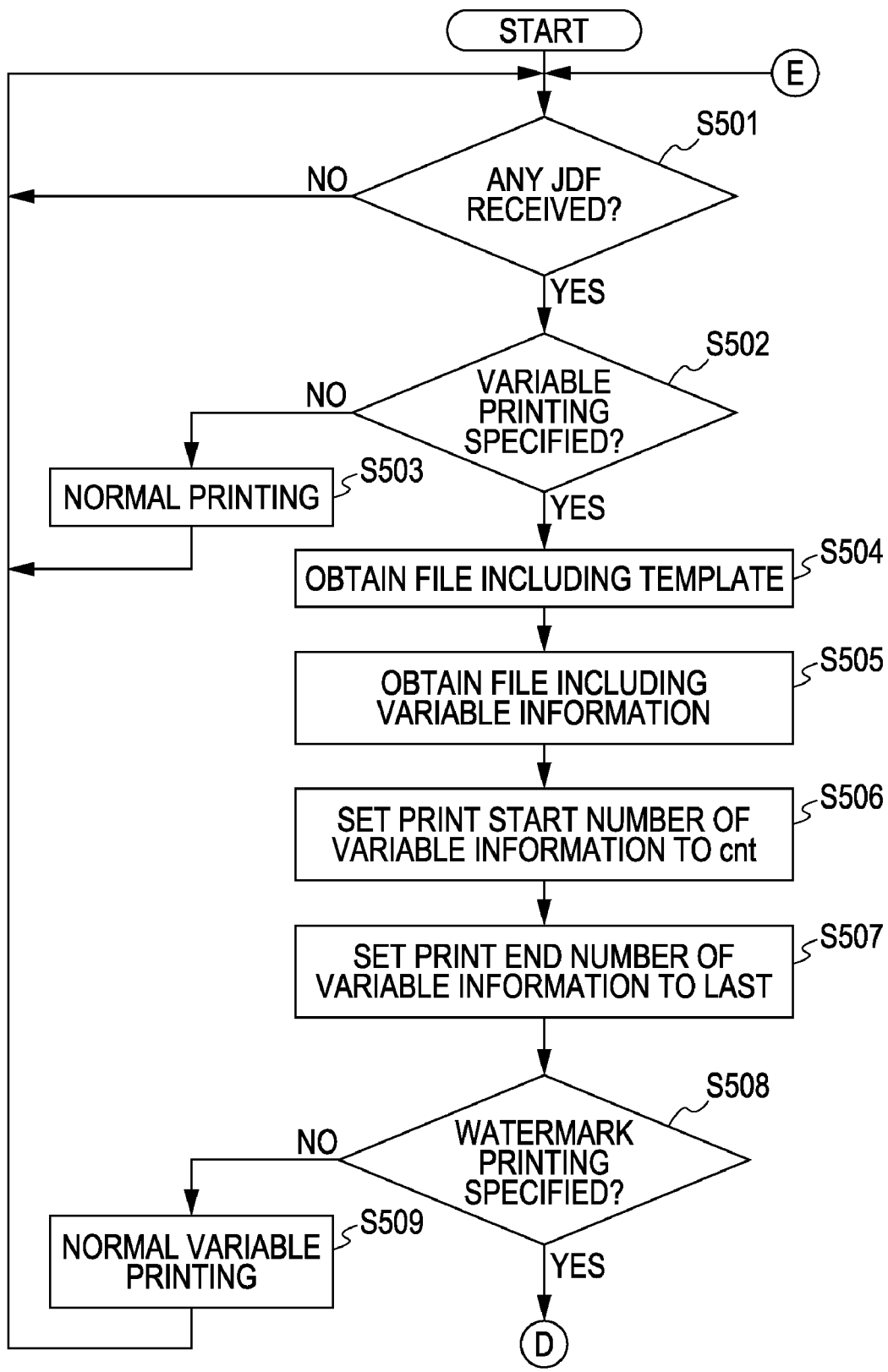

Referring now to the flowcharts of FIGS. 16A and 16B, an exemplary operation of the prepress unit 123 will be described. As described above, the prepress unit 123 generates imposed print data in accordance with a JDF received from the MIS 122.

After initiation a program stored in the hard disk 3 of the personal computer 13, the CPU 1 waits for reception of a JDF from the MIS 122 via the communication unit 7 (step S501). Upon reception of the JDF, the CPU 1 determines whether variable printing has been specified on the basis of the received JDF (step S502). When the determination result indicates that no variable printing has been specified, the CPU 1 performs normal printing (step S503) and repeats the processing in step S501.

In the case that variable printing has been specified, the CPU 1 obtains a file including a template via the communication unit 7 from a URL of the file including the template, which is described in the JDF (step S504).

Next, the CPU 1 obtains a file including variable information via the communication unit 7 from a URL of the file including the variable information, which is described in the JDF (step S505).

The CPU 1 sets a print start number of the variable information, which is described in the JDF, to variable cnt (step S506). Next, the CPU 1 sets a print end number of the variable information, which is described in the JDF, to variable LAST (step S507).

Next, the CPU 1 determines whether watermark printing has been specified in the JDF (step S509). When the determination result indicates that no watermark printing has been specified in the JDF, the CPU 1 determines that normal variable printing has been specified and executes processing to perform normal variable printing in accordance with the details described in the JDF (step S509). Then, the CPU 1 repeats the processing in step S501. In the case that watermark printing has been specified in the JDF, the CPU 1 obtains items to be printed normally on the basis of the details described in the JDF (step S510).

In the case that there is a template specified as an item to be printed normally, the CPU 1 obtains the template from the file including the template. In the case that the cnt-th piece of variable information has been specified as an item to be printed normally, the CPU 1 obtains that variable information from the file including the variable information. The CPU 1 combines the obtained template and the variable information to generate a file and converts the file into an image (S511).

Next, the CPU 1 obtains items to be watermark-printed based on the details described in the JDF. In the case that there is a template specified as an item to be watermark-printed, the CPU 1 obtains the template from the file including the template. In the case that the cnt-th piece of variable information has been specified as an item to be watermark-printed, the CPU 1 obtains that variable information from the file including the variable information. The CPU 1 combines the obtained template and the variable information to generate a file (step S513).

Based on the details described in the JDF, the CPU 1 determines whether a portion to be watermark-printed has been set to be encrypted (step S514). When the determination result indicates that the portion to be watermark-printed has been set to be encrypted, the CPU 1 encrypts the file generated in step S513 (step S515). In the case that the portion to be watermark-printed has not been set to be encrypted, step S515 is omitted.

The CPU 1 now activates the watermark/electronic-data converter 9. The watermark/electronic-data converter 9 converts the file generated in step S513 into watermark image data and generates an image of the watermark image data (step S516).

Next, the CPU 1 combines the image generated in step S511 for the items to be printed normally and the image generated in step S516 for the items to be watermark-printed (step S517). Then, based on the details described in the JDF, the CPU 1 imposes the combined image data.

By determining whether the variable cnt is greater than the variable LAST, the CPU 1 determines whether all the specified pieces of variable information have been imposed (step S519). When the determination result indicates that the variable cnt is greater than the variable LAST (LAST<cnt), the CPU 1 determines that there is variable information that has not been imposed yet and increments the variable cnt (step S520), and the flow returns to step S512.

In the case that the variable cnt is not greater than the variable LAST, the CPU 1 determines that all the pieces of variable information have been imposed, and the imposed image data is converted into print data that can be printed by the press unit 124 (step S521). The CPU 1 sends the print data to the press unit 124 via the communication unit 7 (step S522) and repeats the processing in step S501.

Having received the print data, the press unit 124 prints the received print data on a sheet of paper based on the details described in the JDF received from the MIS 122 and conveys the printed sheet to the postpress unit 125. Having received the printed sheet, the postpress unit 125 cuts, trims, and/or binds the sheet based on the details described in the JDF received from the MIS 122.

Figure 17:
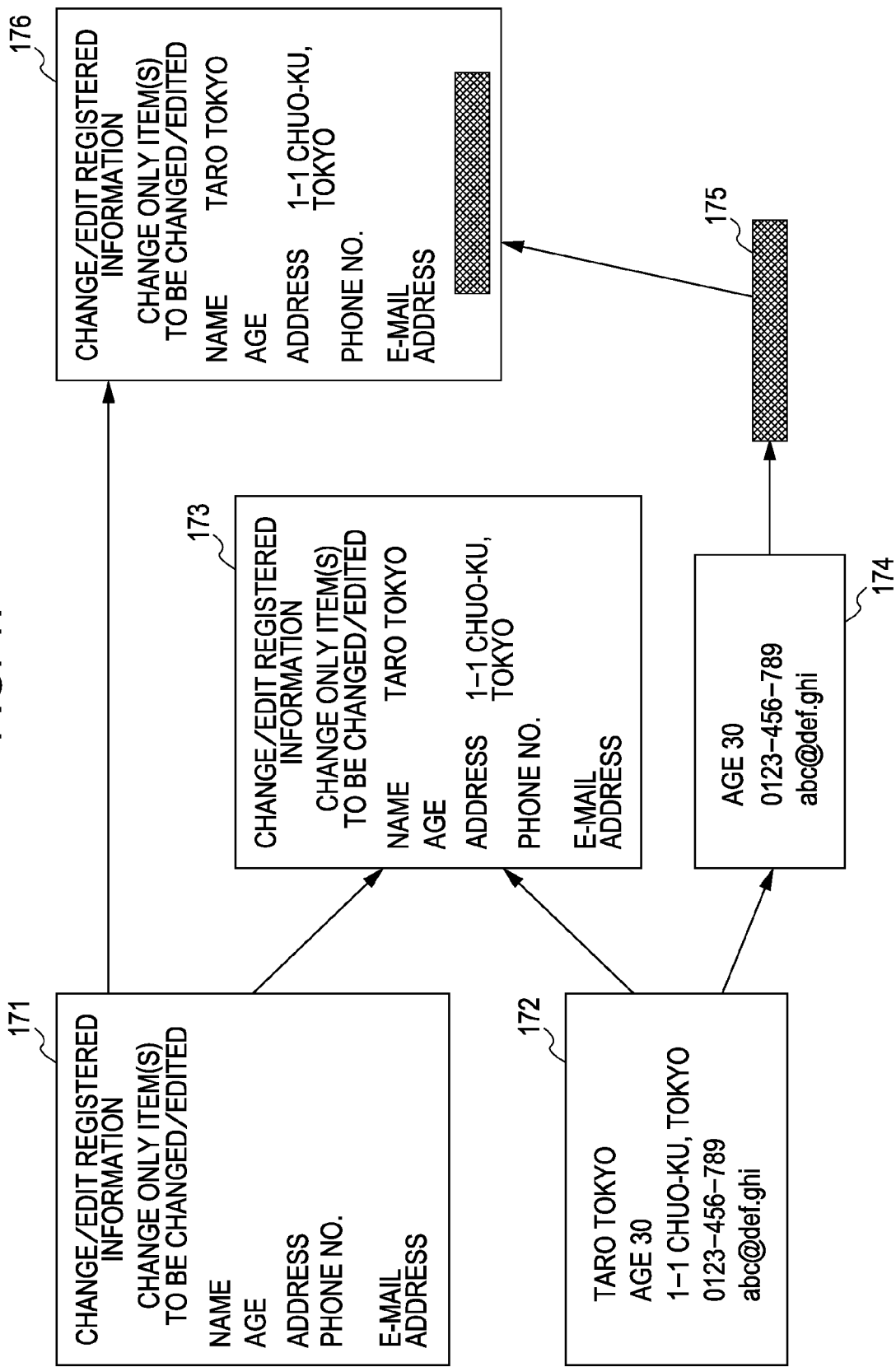
FIG. 17 illustrates an exemplary relationship among a template, variable information, a combined image generated by combining items of the variable information specified to be printed normally and the template, items of the variable information specified to be watermark-printed, and print data according to the third embodiment.

FIG. 17 illustrates an exemplary relationship among a template, variable information, a combined image generated by combining items of the variable information specified to be printed normally and the template, items of the variable information specified to be watermark-printed, and print data according to the present embodiment.

In step S504 illustrated in FIG. 16, a template 171 is obtained. In step S505, variable information 172 is obtained. In step S511, a combined image 173 is generated by combining items of the variable information 172 specified to be printed normally and the template 171. In step S516, items 174 of the variable information 172 specified to be watermark-printed are converted into watermark image data (electronic watermark) 175. In step S517, the combined image 173 and the watermark image data (electronic watermark) 175 are combined to generate print data 176. As has been described above, even in the case that POD (variable information) is performed, a print system that utilizes advantages of a printed matter and advantages of electronic data can be provided. In the case that POD is performed, public information and personal information, such as address, age, and phone number, are combined in many cases. By applying the present embodiment to the case in which variable printing of information including secret information, such as personal information, is performed, public information can be printed on paper, which is a medium that can be distributed at low cost, whereby the information can be directly presented to stimulate the vision of a reader. Secret information, such as personal information, on the other hand can be contained on paper in an electronically editable format, whereby the secret can be protected.

The scope of the present invention also includes the case where software program code for implementing the features of the above-described embodiments is supplied to a computer (a CPU or a microprocessor unit (MPU)) of an apparatus or system connected to various devices such that the devices can be operated to implement the features of the above-described embodiments, and the devices are operated according to the program stored in the computer of the system or apparatus.

In this case, the software program code itself implements the features of the above-described embodiments, and the program code itself and a device for supplying the program code to the computer, such as a recording medium storing the program code, constitute an embodiment of the present invention. Recording media storing the program code include, but are not limited to, a floppy disk, a hard disk, an optical disk, a magneto-optical disk, a compact disk read-only memory (CD-ROM), a magnetic tape, a non-volatile memory card, and a ROM.

The features of the above-described embodiments are implemented by the computer executing the supplied program code. Further, in the case where the program code cooperates with an operating system (OS) running on the computer or other application software to implement the features of the above-described embodiments, the program code is included in an embodiment of the present invention.

The present invention may also include the case where the supplied program code is stored in a memory of a function expansion board of the computer, and thereafter a CPU included in the function expansion board executes part or the entirety of actual processing in accordance with an instruction of the program code, whereby the features of the above-described embodiments are implemented.

Further, the present invention may also include the case where the supplied program code is stored in a memory of a function expansion unit connected to the computer, and thereafter a CPU included in the function expansion unit executes part or the entirety of actual processing in accordance with an instruction of the program code, whereby the features of the above-described embodiments are implemented.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims the benefit of Japanese Application No. 2006-208263 filed Jul. 31, 2006, which is hereby incorporated by reference herein in its entirety.

What is claimed is:

1. A print controlling apparatus generating print data for performing variable printing of differing print contents, comprising:
a template-obtaining unit configured to obtain a template;
a variable-information-obtaining unit configured to obtain variable information;
a watermark-printing-specifying unit configured to specify whether to perform watermark printing;
an item-specifying unit configured to specify an item to be watermark-printed and an item to be printed normally based on the variable information;
a normal-image-data-generating unit configured to generate image data to be printed normally;
a watermark-image-data-generating unit configured to generate watermark image data to be watermark-printed; and
a print-data-output unit configured to output image data for print output,
wherein, when watermark printing is specified by the watermark-printing-specifying unit, the item-specifying unit specifies an item to be watermark-printed and an item to be printed normally based on the variable information, the normal-image-data-generating unit generates first image data to be printed normally based on the template obtained by the template-obtaining unit and the item specified by the item-specifying unit to be printed normally, the watermark-image-data-generating unit generates watermark image data based on the item specified by the item-specifying unit to be watermark-printed, and the print-data generating unit combines the first image data to be printed normally and the watermark image data, and outputs the combined image data as image data for print output, and
wherein, when no watermark printing is specified, the normal-image-data-generating unit generates second image data to be printed normally based on the template obtained by the template-obtaining unit and the variable information obtained by the variable information obtaining unit, and the print-data-output unit outputs the second image data to be printed normally as image data for print output.

2. A print controlling apparatus according to claim 1, wherein the variable information is personal information including at least one of a name, age, address, phone number, or email address.

3. A print controlling apparatus according to claim 1, wherein the template is an electronic file including public information containing no personal information.

4. A print controlling apparatus according to claim 1, wherein the watermark image data is watermark image data embedded as reversibly convertible electronic data.

5. A print controlling apparatus according to claim 1, wherein the item-specifying unit specifies an item from a user interface of a display of the print controlling apparatus.

6. A method of generating print data for performing variable printing of differing print contents, the method comprising:
obtaining a template;
obtaining variable information;
specifying whether to perform watermark printing;
specifying an item to be watermark-printed and an item to be printed normally based on the variable information;
generating image data to be printed normally;
generating watermark image data to be watermark-printed; and
outputting image data for print out,
wherein, when watermark printing is specified, an item to be watermark-printed and an item to be printed normally are specified based on the variable information, first image data to be printed normally is generated based on an obtained template and the item specified to be printed normally, watermark image data is generated based on the item specified to be watermark-printed, generated first image data to be printed normally and generated watermark image data are combined to be output as image data for print output, and
wherein, when no watermark printing is specified, second image data to be printed normally is generated based on an obtained template and on obtained variable information, and generated second image data to be printed normally is output as image data for print output.

7. A method according to claim 6, wherein the variable information is personal information including at least one of a name, age, address, phone number, or email address.

8. A method according to claim 6, wherein the template is an electronic file including public information containing no personal information.

9. A method according to claim 6, wherein generated watermark image data is watermark image data embedded as reversibly convertible electronic data.

10. A method according to claim 6, wherein an item is specified from a user interface of a display of an apparatus performing the print controlling method.

11. A computer-readable storage medium storing a program for performing the method according to claim 6.

* * * * *